US012488149B2

(12) United States Patent
Lilley et al.

(10) Patent No.: US 12,488,149 B2
(45) Date of Patent: Dec. 2, 2025

(54) SYSTEM AND METHOD FOR OPTIMIZING ONLINE PRIVACY RECOMMENDATIONS FOR ENTITY USERS

(71) Applicants: Steven Eric Lilley, Mount Pleasant, SC (US); Anup Kumar Mallikarjun Patnashetty, Bangalore (IN)

(72) Inventors: Steven Eric Lilley, Mount Pleasant, SC (US); Anup Kumar Mallikarjun Patnashetty, Bangalore (IN)

( * ) Notice: Subject to any disclaimer, the term of this patent is extended or adjusted under 35 U.S.C. 154(b) by 72 days.

(21) Appl. No.: 18/385,779

(22) Filed: Oct. 31, 2023

(65) Prior Publication Data

US 2024/0143841 A1    May 2, 2024

Related U.S. Application Data

(63) Continuation-in-part of application No. 17/361,001, filed on Jun. 28, 2021, now Pat. No. 11,880,857.

(60) Provisional application No. 63/044,614, filed on Jun. 26, 2020.

(51) Int. Cl.
*G06F 21/62* (2013.01)

(52) U.S. Cl.
CPC ...... *G06F 21/6263* (2013.01); *G06F 21/6254* (2013.01)

(58) Field of Classification Search
CPC .............. G06F 21/6254; G06Q 20/065; G06Q 30/0609; H04L 9/0897
See application file for complete search history.

(56) References Cited

U.S. PATENT DOCUMENTS

| 11,468,431 | B2* | 10/2022 | Williams | H04L 9/0897 |
| 2013/0205404 | A1* | 8/2013 | King | G06F 21/6254 726/27 |
| 2015/0026330 | A1* | 1/2015 | Ahmed | G06F 21/73 709/224 |
| 2017/0132625 | A1* | 5/2017 | Kennedy | G06Q 20/065 |
| 2018/0174214 | A1* | 6/2018 | Barday | G06Q 30/0609 |
| 2021/0110592 | A1* | 4/2021 | Mourkogiannis | H04L 51/043 |

FOREIGN PATENT DOCUMENTS

CN    104462961 A  *  3/2015  ........... G06F 21/562

* cited by examiner

*Primary Examiner* — Saba Dagnew
(74) *Attorney, Agent, or Firm* — Gregory Finch; Finch Paolino, LLC

(57) ABSTRACT

A system and method for dynamically optimizing online privacy recommendations for entity users. Certain aspects of the present disclosure provide for methods and systems for optimizing an entity privacy rights recommendation in online transactions. In certain embodiments, an entity user creates an account within an end user application comprising a graphical user interface configured to display one or more privacy rights education prompt and an entity user privacy score. The entity user is assigned a unique alpha-numeric identifier for the entity user within the entity user account. The end user application is configured to match the entity user to one or more online category good or service vendor according to the unique alpha-numeric identifier and provide an entity privacy rights recommendation comprising the one or more online category good or service vendor matched to the entity user.

20 Claims, 16 Drawing Sheets

SYSTEM AND METHOD FOR OPTIMIZING ONLINE PRIVACY RECOMMENDATIONS FOR ENTITY USERS

CROSS-REFERENCE TO RELATED APPLICATIONS

The present application is a continuation-in-part of U.S. patent application Ser. No. 17/361,001, filed on Jun. 28, 2021, and entitled, "SYSTEM AND METHOD FOR OPTIMIZING ONLINE PRIVACY RECOMMENDATIONS FOR ENTITY USERS"; which claims the benefit of U.S. Provisional Application Ser. No. 63/044,614, filed Jun. 26, 2020, and entitled, "PERSONAL DATA PRIVACY SYSTEMS AND METHODS PROVIDING EACH ENTITY USER WITH PRIVACY RIGHTS EXPERIENCED AS HUMAN NEEDS THROUGH CONTINUOUS OPTIMIZATION MATCHING OF THE USER'S PRIVACY RIGHTS EDUCATION WITH THEIR HUMAN NEEDS"; the contents of said applications being hereby incorporated herein in their entireties at least by virtue of this reference.

FIELD

The present disclosure relates to the field of online privacy systems; in particular, a system and method for dynamically optimizing online privacy recommendations for entity users.

BACKGROUND

Data privacy protection laws and regulations have been created in countries, such as the United Kingdom or the United States, and in regions/states, such as the European Economic Area (EEA region) or California (United States), which determine how data collection and data processing (either electronic or non-electronic data) must be lawfully performed for a data subject user by each data processor or data controller.

A data processor is an entity that predominantly offers services through such technologies as Software as a Service (SaaS), Platform as a Service (PaaS), and Infrastructure as a Service (IaaS). A data controller, such as a financial institution, education institution, or a sports team, et al. is an entity that determines what data is collected and processed, the purpose of the data collection and processing, and the collection and processing means, which are predominantly SaaS, PaaS, IaaS, Tele-communications technologies, etc. but may be any type of electronic, paper, audio, video, text data collection and processing operation that are executed by data processor(s). The data subject user utilizes data processor(s) and data controller(s) services and technologies for their daily life activities in their country/region.

In order for a data subject user, to understand and enforce their data privacy protection rights, as granted by the laws and regulations of their country/region, a data subject has predominantly had to rely on each respective data processor and data controller website privacy and cookie policy(s), audio/video support privacy disclosures, and website/application privacy terms of service (use) to understand how data processors and data controllers collect and process data for a specific purpose(s). Such policies and terms of service (use) disclosures are: predominantly not readily visible for each data subject user to understand each specific data use in that country/region as displayed by each respective data processor and data controller on its websites, software application log-in pages, SMS or RCS messages, email messages, or phone calls, just to name a few disclosure methods; are lengthy, written by data processor and data controller legal counsel, with key terms and legal rights not easily located and understood by less privacy-educated data subject users; may not be kept updated with the latest country/region data privacy protection regulations; and, that often don't disclose each specific legal use of data and related 'third party' (data processor or data controller) data collection and processing methods, means, policy(s), terms of service (use) or are done in a vague fashion with key terms not easily located and understood by less privacy-educated data subject users.

Personal data privacy systems and methods provide each data subject entity user with privacy rights experienced as human needs through continuous optimization matching of the user's privacy rights education with their human needs through providing each user (educated scorer) with earned, redeemable financial rewards for uniquely privacy scoring each chosen good or service privacy policy and terms of service that also contains shareable user-supplied and consented respective demographic information and for referring additional entity users based on the user's privacy score to receive financial rewards meeting their respective human needs, the financial rewards being optionally donatable by the educated scorer to the community to meet broader human needs.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a computer-implemented method for optimizing an entity privacy rights recommendation for an online transaction, comprising creating, with at least one processor, an entity user account within an end user application comprising a graphical user interface configured to display one or more privacy rights education prompt and an entity user privacy score, wherein the entity user account is associated with an entity user of the end user application; assigning, with the at least one processor, a unique alpha-numeric identifier for the entity user within the entity user account, wherein the unique alpha-numeric identifier comprises a composite identification of an industry or legal privacy standard, a geographic or jurisdictional identifier, a technology platform identifier, a category good or service identifier, an entity user-supplied, consented, and shareable demographic identifier and an entity identifier; matching, with the at least one processor, the entity user to one or more online category good or service vendor according to the unique alpha-numeric identifier; and providing, with the at least one processor via the graphical user interface, the entity privacy rights recommendation comprising the one or more online category good or service vendor matched to the entity user.

In accordance with certain embodiments, the computer-implemented method for optimizing an entity privacy rights recommendation for an online transaction may further comprise one or more steps or operations for analyzing, with the at least one processor, at least one online privacy policy or online terms of service for the one or more online category good or service vendor according to at least one machine learning framework to generate the composite identification of one or more of the industry or legal privacy standard, the geographic or jurisdictional identifier, the technology platform identifier, and the category good or service identifier. In certain embodiments, the computer-implemented method may further comprise one or more steps or operations for presenting, with the at least one processor via the graphical user interface, a one or more user prompts associated with one or more online category good or service list item to the entity user, wherein the one or more user prompts comprise one or more privacy education prompts. The one or more steps or operations may further comprise receiving, with the at least one processor via the graphical user interface, one or more user-generated inputs in response to the one or more user prompts. The one or more steps or operations may further comprise processing, with the at least one processor, the one or more user-generated inputs in response to the one or more user prompts to generate the entity user privacy score. The one or more steps or operations may further comprise analyzing, with the at least one processor, the entity user privacy score and the unique alpha-numeric identifier to match the entity user to the one or more online category good or service vendor. The one or more steps or operations may further comprise presenting, with the at least one processor via the graphical user interface, a one or more subsequent user prompts associated with the one or more online category good or service list item to the entity user, wherein the one or more subsequent user prompts comprise one or more subsequent privacy education prompts. The one or more steps or operations may further comprise receiving, with the at least one processor via the graphical user interface, one or more subsequent user-generated inputs in response to the one or more subsequent user prompts. The one or more steps or operations may further comprise processing, with the at least one processor, the one or more subsequent user-generated inputs to generate an updated entity user privacy score. The one or more steps or operations may further comprise analyzing, with the at least one processor, the updated entity user privacy score and the unique alpha-numeric identifier to provide an updated entity privacy rights recommendation to the entity user via the graphical user interface of the end user application.

In accordance with certain embodiments, the entity privacy rights recommendation for the computer-implemented method may comprise a link for a uniform resource locator for a webpage associated with the one or more online category good or service vendor. In accordance with certain embodiments, the computer-implemented method for optimizing an entity privacy rights recommendation for an online transaction may further comprise one or more steps or operations for tracking, with the at least one processor, one or more online transaction associated with the link for the uniform resource locator for the webpage associated with the one or more online category good or service vendor. In certain embodiments, the computer-implemented method may further comprise one or more steps or operations for providing, with the at least one processor via the graphical user interface, one or more financial rewards to the entity user in response to the one or more online transaction associated with the link for the uniform resource locator for the webpage associated with the one or more online category good or service vendor.

In accordance with certain embodiments, the computer-implemented method for optimizing an entity privacy rights recommendation for an online transaction may further comprise one or more steps or operations for providing, with the at least one processor via the graphical user interface, at least one social sharing link associated with the entity user account to the entity end user. In certain embodiments, the computer-implemented method may further comprise one or more steps or operations for tracking, with the at least one processor, one or more social sharing event associated with the at least one social sharing link associated with the entity user account. In certain embodiments, the computer-implemented method may further comprise one or more steps or operations for providing, with the at least one processor via the graphical user interface, one or more financial rewards to the entity user in response to the one or more social sharing event.

In accordance with certain embodiments, the computer-implemented method for optimizing an entity privacy rights recommendation for an online transaction may further comprise one or more steps or operations for generating, with the at least one processor, a privacy index value for the one or more online category good or service vendor according to the at least one machine learning framework, wherein the privacy index value is directly or inversely correlated to one or more industry parameters for the one or more online category good or service vendor. In certain embodiments, the one or more industry parameters may comprise one or more of a privacy regulation parameter, an adverse legal or regulatory action parameter, a security or privacy-related incident or breach parameter, and a consumer satisfaction or consumer confidence parameter.

Further aspects of the present disclosure provide for a system for optimizing an entity privacy rights recommendation for an online transaction, comprising a processor; and a non-transitory computer readable storage medium communicably engaged with the processor and encoded with processor-executable instructions that, when executed, cause the processor to perform one or more operations comprising creating an entity user account within an end user application comprising a graphical user interface configured to display one or more privacy rights education prompt and an entity user privacy score, wherein the entity user account is associated with an entity user of the end user application; assigning a unique alpha-numeric identifier for the entity user within the entity user account, wherein the unique alpha-numeric identifier comprises a composite identification of an industry or legal privacy standard, a geographic or jurisdictional identifier, a technology platform identifier, a category good or service identifier, an entity user-supplied, consented, and sharable demographic identifier and an entity identifier; matching the entity user to one or more online category good or service vendor according to the unique alpha-numeric identifier; and providing the entity privacy rights recommendation comprising the one or more online category good or service vendor matched to the entity user via the graphical user interface of the end user application.

Still further aspects of the present disclosure provide for a non-transitory computer-readable medium encoded with instructions for commanding one or more processors to execute operations for optimizing an entity privacy rights recommendation for an online transaction, the operations comprising creating an entity user account within an end user application comprising a graphical user interface configured to display one or more privacy rights education prompt and an entity user privacy score, wherein the entity user account is associated with an entity user of the end user application; assigning a unique alpha-numeric identifier for the entity user within the entity user account, wherein the unique alpha-numeric identifier comprises a composite identification of an industry or legal privacy standard, a geographic or jurisdictional identifier, a technology platform identifier, a category good or service identifier, an entity user demographic identifier and an entity identifier; matching the entity user to one or more online category good or service vendor according to the unique alpha-numeric identifier; and providing the entity privacy rights recommendation comprising the one or more online category good or service vendor matched to the entity user via the graphical user interface of the end user application.

Still further aspects of the present disclosure provide for a system for optimizing consumer privacy in online transactions. In accordance with certain aspects of the present disclosure, the system comprises an end user device associated with an entity user, wherein the end user device comprises a personal computing device comprising at least one radio frequency antenna; and at least one remote server communicably engaged with the end user device via a network communications interface, wherein the at least one remote server comprises at least one processor and a non-transitory computer-readable storage medium operably engaged with the at least one processor and encoded with processor-executable instructions that, when executed, cause the at least one processor to perform one or more operations. In accordance with certain aspects of the present disclosure, the one or more operations comprise operations for providing an instance of an end user application to the end user device; providing, via a graphical user interface of the end user application, a plurality of privacy rights education prompts and a plurality of personal demographic data prompts to the entity user; receiving, via the graphical user interface of the end user application, a plurality of user-generated data in response to the plurality of privacy rights education prompts and the plurality of personal demographic data prompts; analyzing the plurality of user-generated data according to at least one data processing framework to generate a privacy score for the entity user; generating a unique identifier for the entity user according to the plurality of user-generated data, wherein the unique identifier comprises a composite identification of two or more of an industry or legal privacy standard, a geographic or jurisdictional identifier, a technology platform identifier, a category good or service identifier, and/or personal demographic data for the entity user, wherein the unique identifier comprises an anonymous identifier for the entity user; analyzing at least one online privacy policy or online terms of service for one or more online category good or service vendor according to at least one machine learning framework; generating a privacy index value for the one or more online category good or service vendor according to the at least one machine learning framework; matching the entity user to one or more online category good or service vendor according to the privacy score and the privacy index value; receiving, from the end user device, transaction data for at least one transaction associated with the entity user, wherein the end user device is configured to receive the transaction data via receiving a data packet with the at least one radio frequency antenna, wherein the transaction data is encoded in the data packet; storing the transaction data for the at least one transaction associated with the entity user in at least one database; and linking the unique identifier to the transaction data in the at least one database.

Still further aspects of the present disclosure provide for a system for optimizing consumer privacy in online transactions. In accordance with certain aspects of the present disclosure, the system comprises an end user device associated with an entity user, wherein the end user device comprises a personal computing device comprising at least one radio frequency antenna; and at least one remote server communicably engaged with the end user device via a network communications interface, wherein the at least one remote server comprises at least one processor and a non-transitory computer-readable storage medium operably engaged with the at least one processor and encoded with processor-executable instructions that, when executed, cause the at least one processor to perform one or more operation. In accordance with certain aspects of the present disclosure, the one or more operations comprise operations for providing an instance of an end user application to the end user device; providing, via a graphical user interface of the end user application, a plurality of privacy rights education prompts and a plurality of personal demographic data prompts to the entity user; receiving, via the graphical user interface of the end user application, a plurality of user-generated data in response to the plurality of privacy rights education prompts and the plurality of personal demographic data prompts, wherein the plurality of user-generated data comprises a plurality of personal demographic data for the entity user; analyzing the plurality of user-generated data according to at least one data processing framework to generate a privacy score for the entity user; generating a unique identifier for the entity user according to the plurality of user-generated data, wherein the unique identifier for the entity user comprises an authentication key for the entity user; wherein the end user device is configured to store the unique identifier for the entity user in a computer-readable storage medium of the end user device; analyzing at least one online privacy policy or online terms of service for one or more online category good or service vendor and an entity user-supplied, consented, and sharable demographic identifier according to at least one machine learning framework; generating a privacy index value for the one or more online category good or service vendor according to the at least one machine learning framework; matching the entity user to one or more online category good or service vendor according to the privacy score and the privacy index value; receiving, from the end user device, the unique identifier for the entity user at one or more time points; authenticating at least one computing session for the entity user according to the unique identifier; and in response to authenticating the at least one computing session for the entity user according to the unique identifier, receiving, from the end user device, transaction data for at least one transaction associated with the entity user, wherein the end user device is configured to receive the transaction data via receiving a data packet with the at least one radio frequency antenna, wherein the transaction data is encoded in the data packet.

Still further aspects provide for a computer-implemented method for optimizing an entity privacy rights recommendation for an online transaction. In accordance with certain aspects of the present disclosure, the computer-implemented method comprises one or more steps or operations for creating, with at least one processor, an entity user account within an end user application comprising a graphical user interface configured to display one or more privacy rights education prompt and an entity user privacy score, wherein the entity user account is associated with an entity user of the end user application; providing, with the at least one processor via a network interface, an instance of the end user application to an end user device associated with the entity user, wherein the end user device comprises at least one radio frequency antenna, receiving, with the at least one processor, at least one personal demographic data item for the entity user; assigning, with the at least one processor, a unique alpha-numeric identifier for the entity user within the entity user account; receiving, with the end user device, transaction data for at least one transaction associated with the entity user; providing, with the end user device via the network interface, the transaction data to the at least one processor; validating, with the at least one processor, at least one transaction for the entity user according to the transaction data; matching, with the at least one processor, the entity user to one or more online category good or service vendor according to the unique alpha-numeric identifier, the transaction data, and the at least one personal demographic data item for the entity user; and providing, with the at least one processor via the graphical user interface, the entity privacy rights recommendation comprising the one or more online category good or service vendor matched to the entity user.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
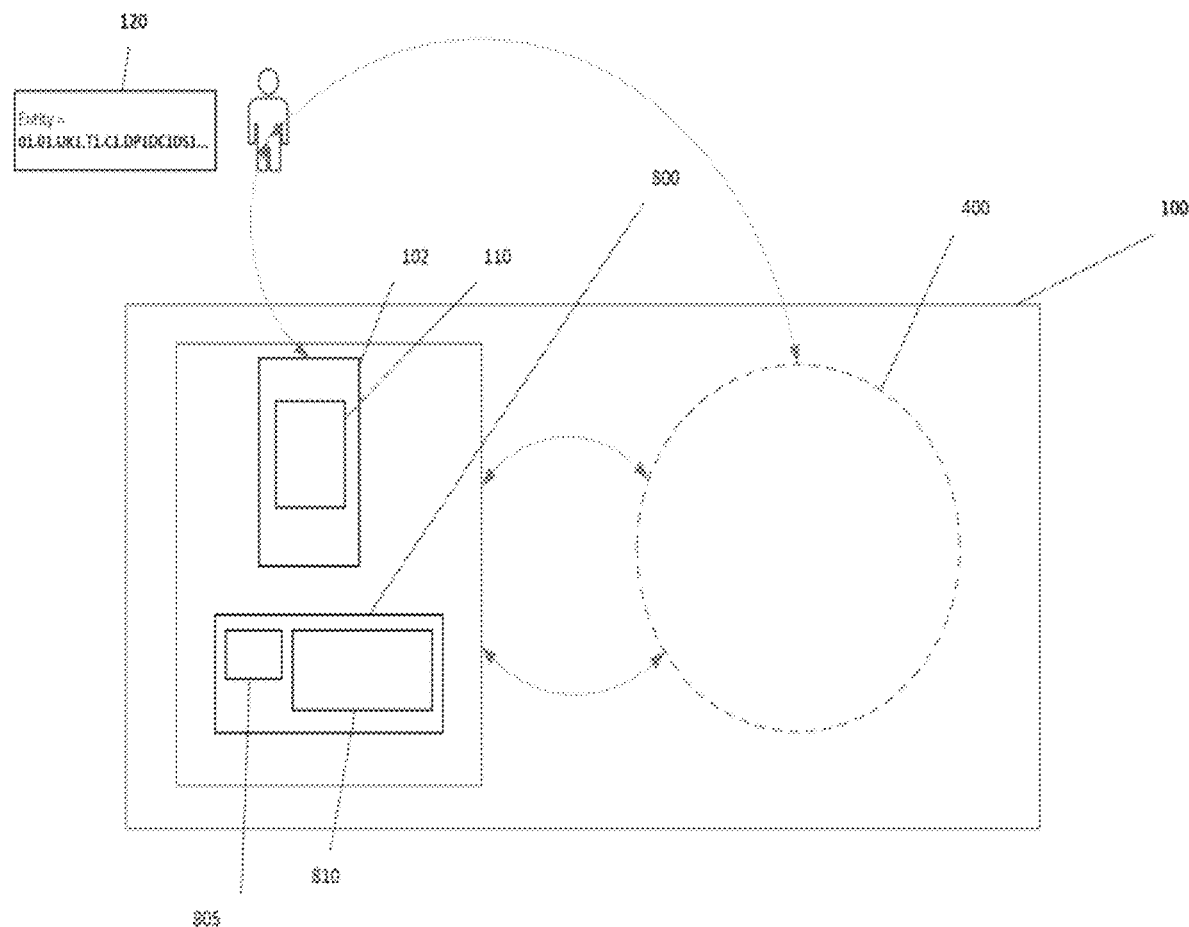
FIG. 1 is a block diagram of a system providing each entity user with privacy rights through continuous optimization matching of the user's privacy rights education with online goods and services consumption and/or transactions.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, apparatus and systems configured to provide for a computer-implemented method for optimizing an entity privacy rights recommendation for an online transaction, comprising creating, with at least one processor, an entity user account within an end user application comprising a graphical user interface configured to display one or more privacy rights education prompt and an entity user privacy score, wherein the entity user account is associated with an entity user of the end user application; assigning, with the at least one processor, a unique alpha-numeric identifier for the entity user within the entity user account, wherein the unique alpha-numeric identifier comprises a composite identification of an industry or legal privacy standard, a geographic or jurisdictional identifier, a technology platform identifier, a category good or service identifier, and an entity identifier; matching, with the at least one processor, the entity user to one or more online category good or service vendor according to the unique alpha-numeric identifier; and providing, with the at least one processor via the graphical user interface, the entity privacy rights recommendation comprising the one or more online category good or service vendor matched to the entity user.

Before the present invention and specific exemplary embodiments of the invention are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

Any publications discussed herein are provided solely for their disclosure prior to the filing date of the present application. Nothing herein is to be construed as an admission that the present invention is not entitled to antedate such publication by virtue of prior invention. Further, the dates of publication provided may differ from the actual publication dates which may need to be independently confirmed.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

The terms "end user" and "entity user" may be used interchangeably in different contexts as described herein.

An exemplary system, method, and apparatus according to the principles herein may include an online privacy optimization platform with two-sided network effects. In accordance with various aspects of the present disclosure, privacy education for an entity user is relied upon to fulfill one or more needs of the entity user through the user's respective category goods and services privacy scores to motivate their respective category goods and services consumption. In accordance with certain aspects of the present disclosure, a privacy optimization platform enables network orchestration between entity users and online vendors to create shared value (i.e., entity user demand is supplied/fulfilled with online vendor supply via the privacy optimization platform). The privacy optimization platform of the present disclosure is configured to minimize negative network effects through quality curation (i.e., the privacy optimization platform is configured to continually configure for entity user privacy choices to programmatically deliver to improve quantity and quality of automatically matched category goods and services privacy, scoring, rewards, and redemptions).

An exemplary system, method, and apparatus according to the principles herein may include an online privacy optimization platform configured to present one or more computerized prompts or interactions to an entity user within a graphical user interface of an end user application to determine and/or apply one or more parameters and/or metrics for one or more platform participants, value units and filters. In accordance with certain aspects of the present disclosure, one or more "participants" may include one or more platform users and/or online vendors having one or more published privacy policies, online terms of service, applicable privacy regulations/legal standards, and the like. In accordance with certain aspects of the present disclosure, a "value unit" may include an interaction between participants with an exchange of information that has value to participants. In accordance with certain aspects of the present disclosure, one or more "filters" may comprise one or more algorithmic software-based tools utilized by the online privacy optimization platform to enable the exchange of appropriate value units between participants. One or more filters may be configured to deliver one or more value units and/or while blocking less/unvaluable units, per participant.

An exemplary system, method, and apparatus according to the principles herein may include an online privacy optimization platform configured to perform one or more steps or operations for pulling, facilitating and matching one or more online privacy parameters or metrics for one or more participants. In accordance with certain aspects of the present disclosure, one or more steps or operations for "pulling" may comprise a single user feedback loop, by which the one or more the platform learns about each unique identifier (UID), the more accurate its recommendations become for that UID. In accordance with certain aspects of the present disclosure, one or more steps or operations for "facilitating" may comprise the process (e.g., infrastructure) in which value can be created and exchanged, without controlling value creation, within the platform. In accordance with certain aspects of the present disclosure, one or more steps or operations for "matching" may comprise various efficiencies created by matching the right participants with one another and ensuring the most relevant goods and services are exchanged therebetween.

An exemplary system, method, and apparatus according to the principles herein may include an online privacy optimization platform comprising a modular system architecture. In accordance with certain aspects of the present disclosure, a modular system architecture may include one or more computer system elements configured to organize complex products and processes efficiently. In accordance with certain aspects of the present disclosure, a modular system architecture may include one or more value unit design aspects including, but not limited to, respective category goods and services privacy policy and terms of service, such as AMAZON category goods and services, decentralized computer networks (Blockchain, cryptography, cryptographic currency), ACH rewards fulfillment (e.g., DIWOLLA), and participant historical goods and services consumption.

In accordance with certain aspects of the present disclosure, a modular system architecture may include one or more filters. In certain embodiments, one or more filters may include one or more steps or operations for creating a unique identifier for an entity user comprising a specified ontology for identifying one or more industry and/or legal standard using an alpha-numeric identifier with one or more unique identifiers. In certain embodiments, the method and system of the present disclosure may be configured to generate a per entity privacy score unique identifier comprising one or more of privacy elements including, but not limited to, privacy industry or legal standards, technology platforms, category goods or services, data controller/processor/subject entities, an entity user-supplied, consented, and sharable demographic item(s), category good or service privacy policy and terms of service list items. The one or more of privacy elements may be paired and matched with an entity user's needs via a continuous feedback loop. In accordance with certain aspects of the present disclosure, one or more filters may include a privacy education/assessment for an entity user comprising a score/output that is paired and matched to the entity user's needs via a continuous feedback loop. In accordance with certain aspects of the present disclosure, one or more filters may include privacy score rewards for the entity user that are redeemed, paired and matched to the entity user's needs via a continuous feedback loop. In accordance with certain aspects of the present disclosure, one or more of filters may include referral rewards for the entity user that are redeemed, paired and matched to the entity user's needs via a continuous feedback loop.

In accordance with certain aspects of the present disclosure, one or more per entity category privacy score choices for the entity user may be redeemed, paired and matched to the entity user's needs via a continuous feedback loop. In accordance with certain embodiments, a per entity privacy score may include at least one privacy industry or country/region legal standard. In accordance with certain embodiments, a per entity privacy score and rewards redeemed may be associated with a specific technology platform. In accordance with certain embodiments, a per entity privacy score and rewards redeemed may be associated with a category good or service. In accordance with certain embodiments, a per entity privacy score and rewards redeemed may include a data controller and/or a data processor and/or a data subject entity. In accordance with certain embodiments, a per entity privacy score may include a category good or service privacy policy and terms of service list item. In accordance with certain embodiments, a per entity privacy score may include one or more confirming/non-confirming choices per category good or service privacy policy and terms of service list item.

An exemplary system, method, and apparatus according to the principles herein may include an online privacy optimization platform configured to generate a dynamic privacy score index for one or more platform entities or participants (e.g., online goods/services vendor(s)). In accordance with certain aspects of the present disclosure, a dynamic privacy score index may be directly or inversely correlated to one or more industry parameters. In certain embodiments, a dynamic privacy score index may be inversely/negatively correlated to one or more privacy regulations or legal standards (e.g., GDPR). In certain embodiments, a dynamic privacy score index may be inversely/negatively correlated to entities (e.g., online goods/services vendor(s)) facing potential/actual adverse legal and/or regulatory action(s) due to security/privacy-related incident(s) breaches. In certain embodiments, a dynamic privacy score index may be directly/positively correlated to a consumer (e.g., entity-data subject) satisfaction index and/or a consumer confidence index per category of goods or services and/or across all categories of goods or services.

An exemplary system, method, and apparatus according to the principles herein may include an online privacy optimization platform configured to reconfigure value creation, consumption, quality control to tap new sources of supply and minimize user barriers of usage for one or more entity users. Certain embodiments may provide a graphical user interface of an end user application comprising one or more category logos to reduce UID negative privacy score elements and increase scores/rewards/redemptions associated with one or more entity user needs. In certain embodiments, one or more UID Algorithms may include category logo matching based on scores and rewards. As platform scaling occurs, UID curation efforts gather better UID data for category goods/services with better score/reward/redemption for improved needs matching.

An exemplary system, method, and apparatus according to the principles herein may include an online privacy optimization platform configured to enhance curation mechanisms (e.g., UIDs) that improve quality of consumer/vendor interactions and capture excess value without negative network effect tradeoffs. The online privacy optimization platform may comprise one or more application programing interface (API) or software development kit (SDK) configured to enable category goods/services developers to provide UID scores, rewards, and redemptions associated with one or more entity user needs.

Referring now to the drawings in which like reference numbers denote like elements throughout, FIG. 1 is a block diagram of a system 100 configured to perform methods of identifying and optimization matching entity 01.01.UK1.T1.C1.DP1DC1DS1 . . . privacy rights education with an entity user's needs (e.g., purchased goods and services). The system 100 includes an application component 110 configured to execute on an entity (user) device 102, such as a mobile electronic device, laptop computer, desktop computer, or other computing device 102. The application component 110 is configured to identify and present one or more dynamically-generated lawful basis for processing one or more data standard or non-standard list item(s) per category good or service for the entity user list item(s) (e.g., verification or non-verification, like or not like, understand or don't understand) to dynamically, uniquely score such category good or service for the entity user (i.e., the educated scorer). Such information for data privacy education and educated scorer needs include, but are not limited to, access components: mobile browser(s) and/or personal computer browser(s) and/or digital frequency advertisements (e.g., BLUETOOTH).

Figure 2:
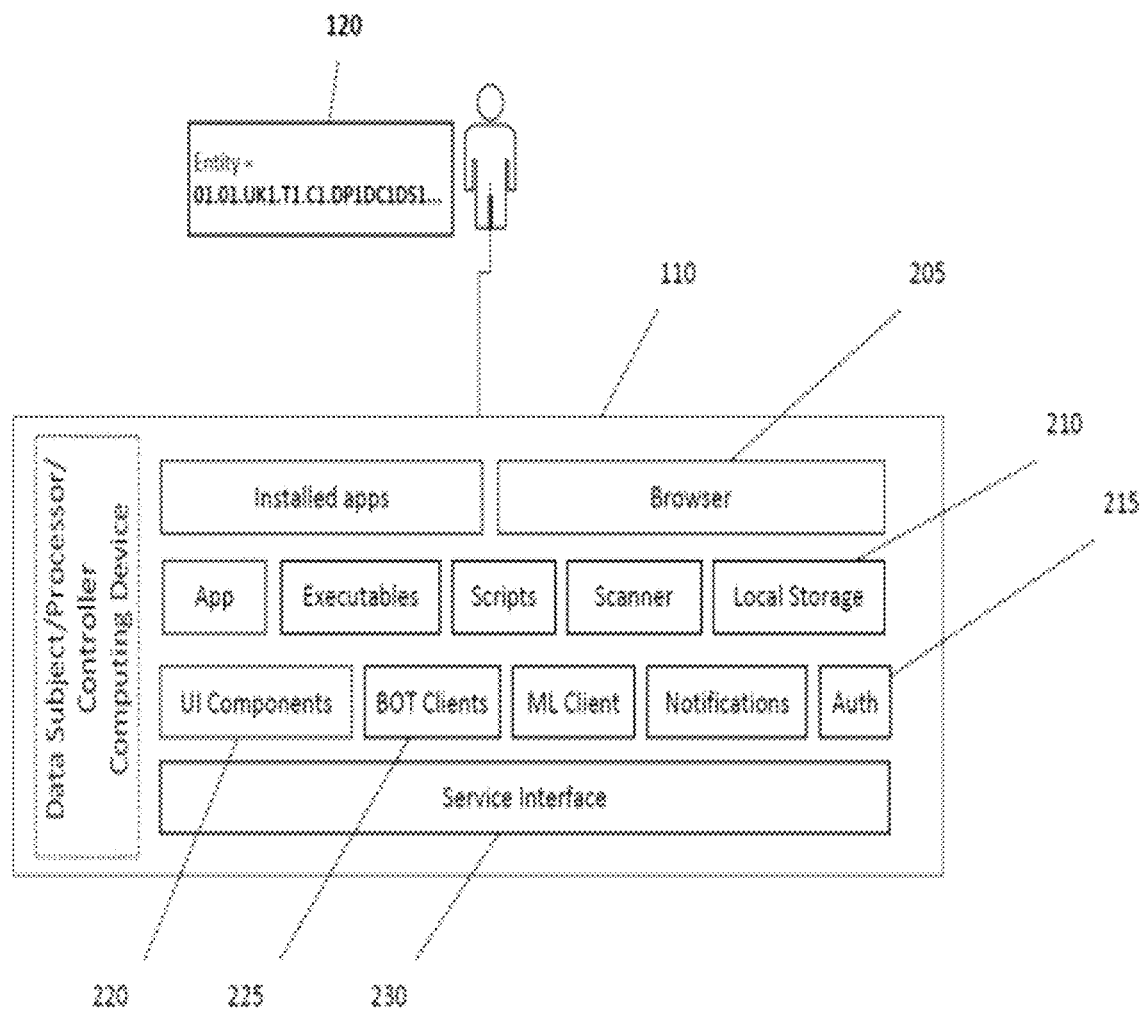
FIG. 2 shows an application component of the system reflecting one embodiment of the present disclosure.

In accordance with certain aspects of the present disclosure, entity access management component 120 provides each permissioned entity in each country/region with access, along with the application component 110, to the entity privacy display component 120 to display, manage, or access some of the data privacy information along with the application component 110. The entity access management and entity privacy display management components 120 may preferably reside on a separate component (e.g., an entity server(s)) to the application component 110, such as an executable component 215 (as shown in FIG. 2) that may be actively providing the entity access management and entity privacy display via an Application Programming Interface (API) to this separate component 120. The executable component 215 may interact with the application component 110 via the application interface 205.

Figure 8:
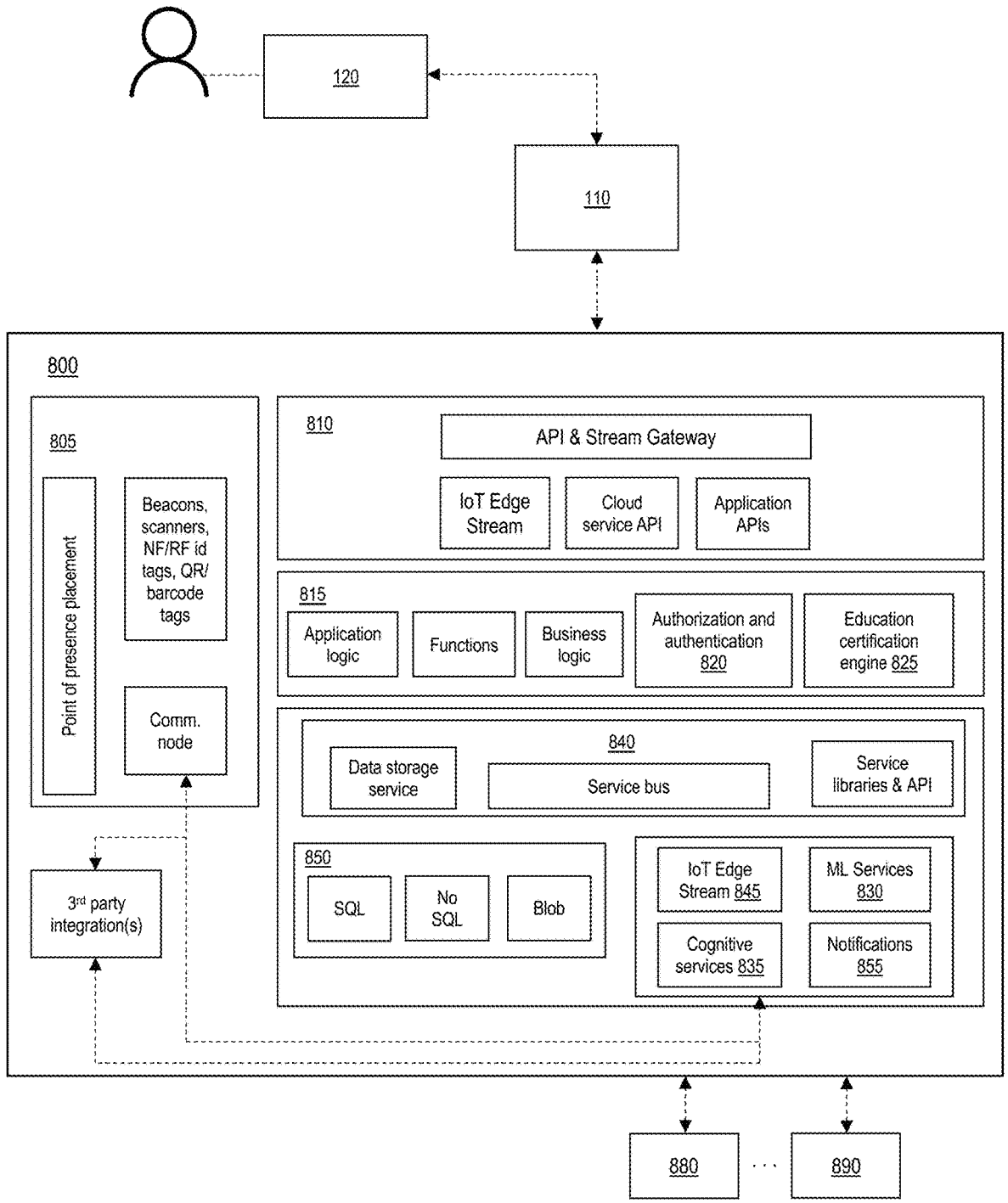
FIG. 8 is a block diagram of one example of a distributed computer system, in which various aspects and embodiments of this disclosure may be implemented.

In accordance with certain aspects of the present disclosure, personal data privacy systems and methods providing each entity user with privacy rights experienced as human needs occur with component 110 interacting with a system 800 (as shown in FIG. 8) comprising a backend infrastructure for each occurrence of identifying and optimization matching entity 01.01.UK1.T1.C1.DP1DC1DS1 . . . privacy rights education ("S.E.R.R.R.") with the entity user's needs ("S.U.C.C.E.S.S.R.") represented in 400. Component 110 interacts with two subsystems of 800, which include 810 providing a representative backend infrastructure supporting component 110 and 805 providing representative ways and means of capturing all entity component 120 interactions between data processors, data controllers, and data subjects. This represents a data validation link between Privacy Rights Educated Scorer and their good or service consumed. Another important aspect is that constant action of 120 by using 110 and 800 enables S.E.R.R.R. and in-turn creates the experience of S.U.C.C.E.S.S.R., as represented by 400.

FIG. 2 shows an application component 110 reflecting one embodiment of the invention. The application component 110 is one of the embodiments of invention, it consists of the following components: 205 is the locally installed or the browser driven component a local data store 210 which is augmented by server/cloud data store 850 as represented in FIG. 8, the client authorization module 215 authorizes the user entity by collaborating with 820. The UI component 220 glues the user interface component with client data validations, functions, device APIs to achieve scanning, use of camera, barcode scanner, RFID or any other hardware/device capabilities. 225 represents Artificial Intelligence (AI), Machine Learning (ML) and System and/or Entity Notification components which together operate to facilitate and improve deification and optimization matching 01.01.UK1.T1.C1.DP1DC1DS1 . . . privacy rights education (i.e., S.E.R.R.R.) with the entity's human needs (i.e., S.U.C.C.E.S.S.R.) represented in 400. Representative interaction happens with the server/backend infrastructure through the network and service interface 230.

The data store 210 may store the information types and uses related to data privacy and human needs optimization matching, or identifiers thereof, to include relevant entity access management component 120 information from the application component 110 via the network interface 230. The data store 210 along with 850 may store such data privacy information in association with one or more users for which those types and uses are relevant. The data store 210 may also store metadata about the data privacy and/or human needs information to be used to filter data in certain ways by each permissioned entity. The application component 110 may communicate with the other components of the system 200 using a network/service interface 230 provided by the application, or by the application interface 205 and 220 generally. The network/service interface 230 may not be included in the application component 110.

Figure 3:
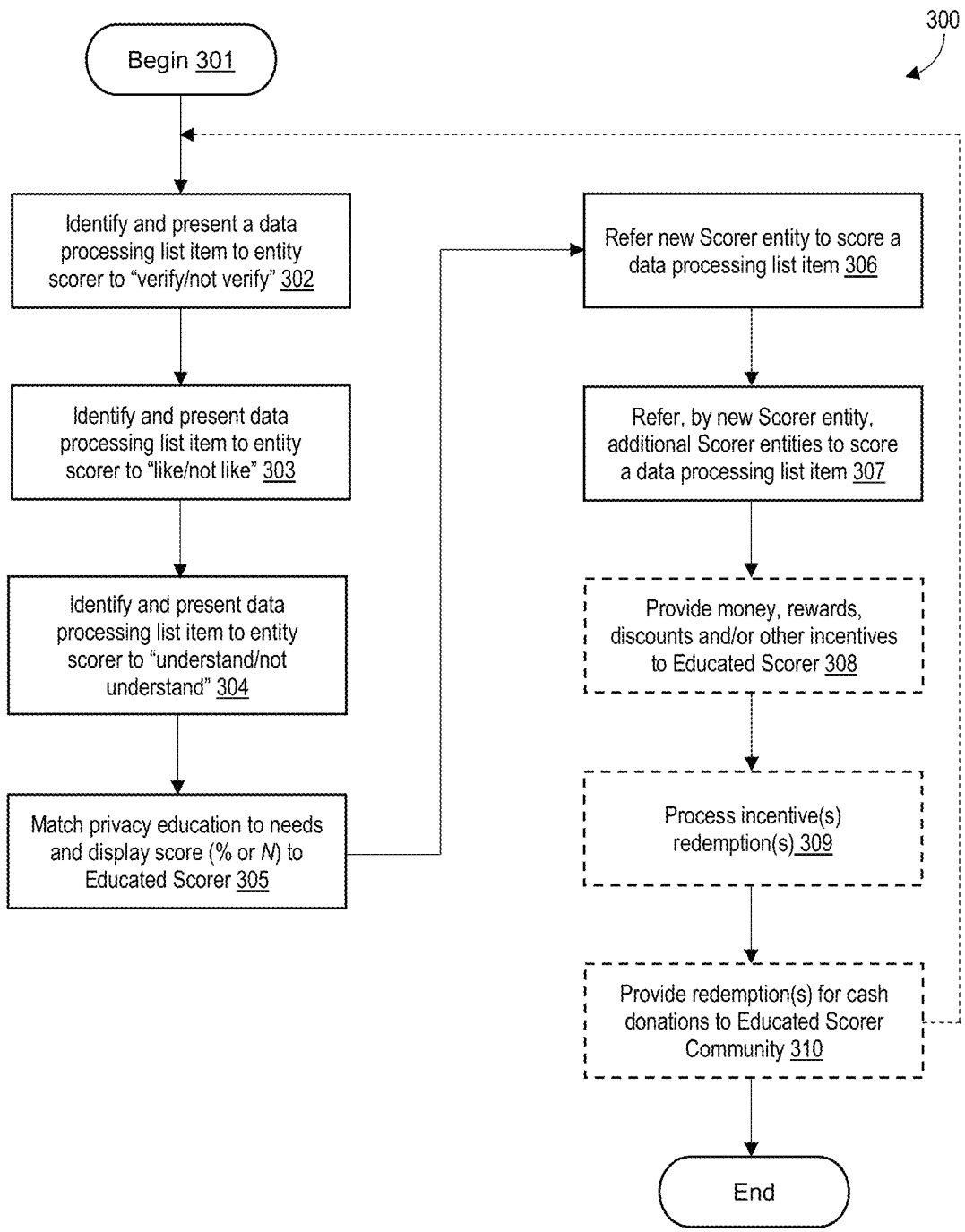
FIG. 3 illustrates a method for the system reflecting one embodiment of the invention to identify and dynamically generate for each respective entity a unique composite alphanumeric identifier.

FIG. 3 illustrates a method 300 for system 100 to identify and dynamically generate for each respective entity—data processor, data controller, and data subject—a unique composite alphanumeric identifier, such as 01.01.UK1.T1.C1.DP1DC1DS1 . . . with a continuous feedback loop that optimally matches each entity user's privacy rights education with the user's human needs through the entity's privacy scoring category goods or services privacy policies and terms of service to configure an educated scorer within an end user application. In accordance with certain aspects of the present disclosure, the educated scorer may refer additional entity privacy scorer(s) to generate one or more privacy scores. Privacy score for one or more entity users may be generated for one or more category goods or services. Entity users may receive one or more user rewards based on the user's privacy score and the system may dynamically match each entity user's privacy actions with their respective needs (e.g., subsistence, understanding and growth, connection and love, contribution, esteem and identity, self-governance, and significance and purpose).

In accordance with certain aspects of the present disclosure, method 300 begins at Step 301. At step 302, based upon an industry and/or legal standard 'paired and matched' to a geography 'paired and matched' to a category good or service 'paired and matched' to an entity, such as a data processor, a data controller, and a data subject, the system 100 identifies and presents a dynamically-generated lawful basis for data processing list item from a respective category good or service privacy policy and terms of service, that is tracked by an composite unique alpha-numeric identifier such as 01.01.UK1.T1.C1.DP1DC1DS1, to the entity scorer to 'verify or not verify,' or other confirming/non-confirming word, resulting in the calculation of unique Scorer Privacy Score % or N per Category Good or Service.

At step 303, based upon an industry and/or legal standard 'paired and matched' to a geography 'paired and matched' to a category good or service 'paired and matched' to an entity, such as a data processor, a data controller, and a data subject, the system 100 identifies and presents a dynamically-generated lawful basis for data processing list item from a respective category good or service privacy policy and terms of service, that is tracked by an composite unique alpha-numeric identifier such as 01.01.UK1.T1.C1.DP1DC1DS1, to the entity Scorer to 'like or not like,' or other confirming/non-confirming word, resulting in the calculation of unique Scorer Privacy Score % or N per Category Good or Service.

At step 304, based upon an industry and/or legal standard 'paired and matched' to a geography 'paired and matched' to a category good or service 'paired and matched' to an entity, such as a data processor, a data controller, and a data subject, the system 100 identifies and presents a dynamically-generated lawful basis for data processing list item from a respective category good or service privacy policy and terms of service, that is tracked by a composite unique alpha-numeric identifier such as 01.01.UK1.T1.C1.DP1DC1DS1, to the entity Scorer to "Understand or Don't Understand," or other confirming/non-confirming word, resulting in the calculation of unique Scorer Privacy Score % or N per Category Good or Service and the calculation of the entity Privacy Education Levels.

At step 305, the entity Educated Scorer with the composite unique alpha-numeric identifier alphanumeric identifier such as 01.01.UK1.T1.C1.DP1DC1DS1 across steps, 302-304 will have their privacy rights education optimally matched with some or all of their human needs (e.g., subsistence, understanding and growth, connection and love, contribution, esteem and identity, self-governance, and significance and purpose), as tracked and displayed to the Educated Scorer in the system 100.

For example, the lawful basis for data processing list item may be from the manufacturer of a pair of shoes, a Data Controller and/or Data Processor for which the entity, Data Subject, who is interested in purchasing. The system 100, will display dynamically-generated lawful basis for data processing list item from the respective manufacturer category good or service privacy policy and terms of service, that is tracked by an composite unique alpha-numeric identifier such as 01.01.UK1.T1.C1.DP1DC1DS1, providing the Data Subject with the privacy right to 'verify or not verify' (step 302), 'like or not like' (step 303), and 'understand or not understand' (Step 304), this list item with a resultant unique Educated Scorer Privacy Score is % or N for that category logo to inform the Educated Scorer's purchase decision based upon how their personal privacy rights have affected their understanding and growth, esteem and identity, self-governance, and significance and purpose needs (step 305).

At step 306, the entity Educated Scorer upon completion of steps 302-304 can be eligible, and motivated to refer additional Scorer entity(s) such as 01.01.UK1.T1.C1.DP1DC1DS2 to privacy score a category good or service dynamically-generated lawful basis for data processing list item due to their receiving potential Rewards and accompanying human needs fulfillment, such as connection and love, contribution, and significance and purpose (step 305).

At step 307, the referred Educated Scorer in step 306 whom has completed steps 302-304 can be eligible, and motivated to refer additional Scorer entity(s) such as 01.01.UK1.T1.C1.DP1DC1DS3 to privacy score a category good or service dynamically-generated lawful basis for data processing list item due to their receiving potential Rewards along with the originating Educated Scorer entity, 01.01.UK1.T1.C1.DP1DC1DS1, receiving additional potential Streak Rewards with both 01.01.UK1.T1.C1.DP1DC1DS1 and 01.01.UK1.T1.C1.DP1DC1DS2 gaining accompanying human needs fulfillment, such as connection and love, contribution, and significance and purpose (step 305).

At step 308, steps 301-304, 306 and 307 fulfilled by any or all Educated Scorers, such as 01.01.UK1.T1.C1.DP1DC1DS1 . . . provide one or more incentives for the Educated Scorer including, but not limited to, monies, rewards, discounts and/or other incentives that satisfy human needs.

At steps 309-310, the entity Educated Scorer may redeem one or more incentives (e.g., cash or cash discounts) from Good or Service Category(s) Logo(s) and/or provide for Educated Scorer Redemptions for cash donations for Educated Scorer Community (i.e., School Districts, etc.) usage and consumption, with financial reward redemptions fulfilling subsistence, understanding and growth, connection and love, contribution, esteem and identity, self-governance, and significance and purpose human needs, step 305.

Figure 4:
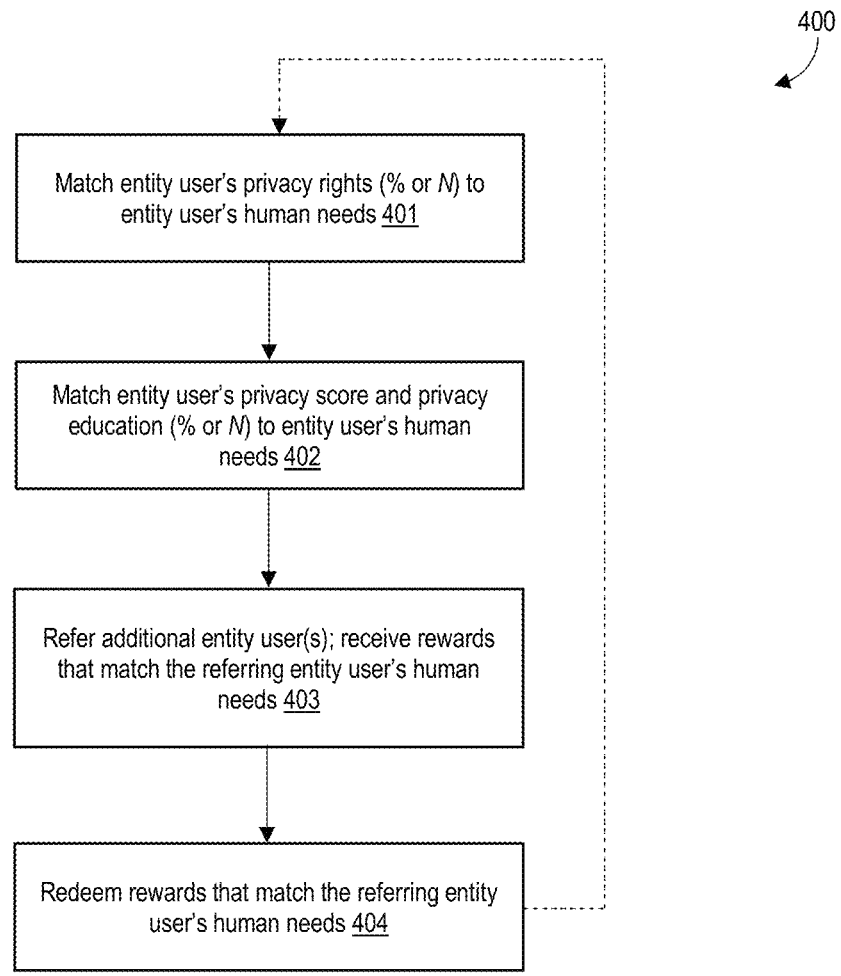
FIG. 4 illustrates a method for the system reflecting one embodiment of the invention to identify and dynamically generate for each respective entity a unique composite alphanumeric identifier.

FIG. 4 illustrates an exemplary optimization matching process 400 for method 300 for system 100 to utilize continuous feedback loops between each privacy educated entity (e.g., data processor, data controller, and data subject—01.01.UK1.T1.C1.DP1DC1DS1) to dynamically match educated entity's privacy rights is % or N equal to the privacy educated entity's human needs (expressed as a % or N), 401.

Privacy score and privacy education match human needs 402 at steps 302-305 for method 300 for the Educated Scorer. This is based upon an industry and/or legal standard 'paired and matched' to a geography 'paired and matched' to a category good or service 'paired and matched' to an entity, such as a data processor, a data controller, and a data subject, the system 100 identifies and presents a dynamically-generated lawful basis for data processing list item from a respective category good or service privacy policy and terms of service, that is tracked by an composite unique alpha-numeric identifier such as 01.01.UK1.T1.C1.DP1DC1DS1, to the entity Scorer to 'verify or not verify,' or other confirming/non-confirming word, 'like or not like, or other confirming/non-confirming word, and 'understand or don't understand,' or other confirming/non-confirming word resulting in the calculation of unique Scorer Privacy Score % or N per Category Good or Service, steps 302-304.

At step 305, the entity Educated Scorer with the composite unique alpha-numeric identifier alphanumeric identifier such as 01.01.UK1.T1.C1.DP1DC1DS1 across steps, 302-304 will have their privacy rights education optimally matched with some or all of their human needs, such as subsistence, understanding and growth, connection and love, contribution, esteem and identity, self-governance, and significance and purpose as tracked and displayed to the Educated Scorer in system 100.

Educated Scorer refers additional Educated Scorer(s) for rewards matching the referring Educated Scorer's human needs 403 at steps 305, 306 for method 300. At step 306, the entity Educated Scorer upon completion of steps 302-304 are eligible, and motivated to refer additional Scorer entity(s) such as 01.01.UK1.T1.C1.DP1DC1DS2 to privacy score a category good or service dynamically-generated lawful basis for data processing list item due to their receiving potential Rewards and accompanying human needs (e.g., subsistence, understanding and growth, connection and love, contribution, esteem and identity, self-governance, and significance and purpose) (step 305).

Educated Scorer receives Streak Rewards based upon referred Educated Scorer(s) referring additional Educated Scorers 403, whom have completed steps 302-304 and steps 306, 307 for method 300, matching the original referring Educated Scorer's human needs fulfillment, step 305. Educated Scorer is provided with Rewards Redemptions for cash or cash discounts from category good or service logo(s) and, or, is provided with Reward Redemptions for cash donations for Educated Scorer Community (e.g., School Districts) usage and consumption, matching the Educated Scorer's human needs 404 at steps 302-310 for method 300, matching the Educated Scorer's human needs fulfillment (step 305).

Figure 5:
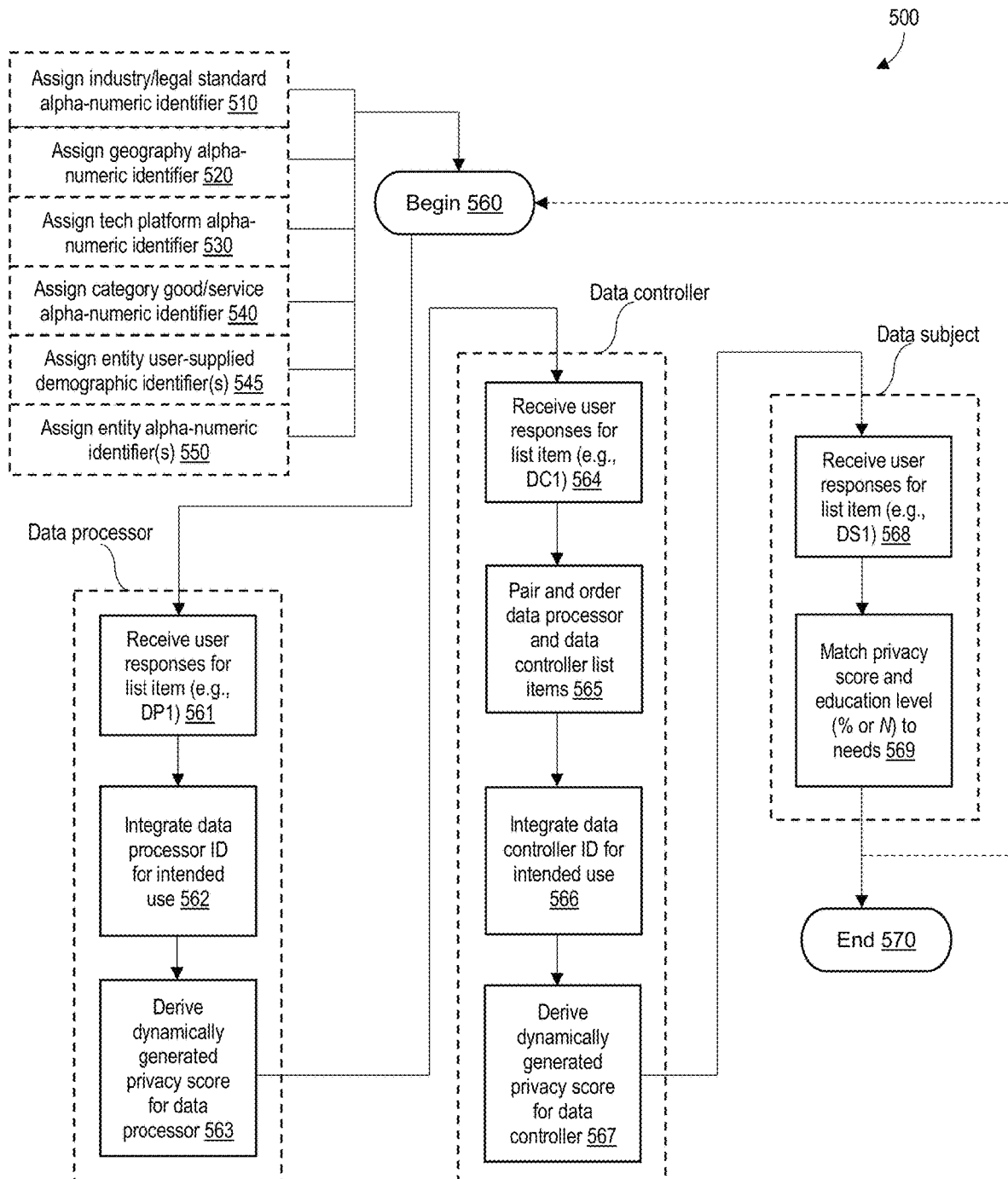
FIG. 5 illustrates a method with a matching process for a system reflecting one embodiment of the invention utilizing an exemplary composite alpha-numeric identifier.

FIG. 5 illustrates a method 500 with an optimization matching process for system 100 that identifies and dynamically generates a composite alpha-numeric identifier, such as 01.01.UK1.T1.C1.DP1DC1DS1 . . . to track and illustrate each lawful basis for processing list item(s) from a category good or service privacy policy and terms of service according to an industry and legal standard matched to a geography matched to a category good or service matched to an entity with a resultant entity privacy score and privacy rights education utilizing continuous feedback loops to optimally match each entity user's privacy rights education with that respective entity user's human needs (e.g., subsistence, understanding and growth, connection and love, contribution, esteem and identity, self-governance, and significance and purpose).

The matching process that creates the dynamically-generated composite alpha-numeric identifier includes steps 510-560 to optimally match each entity user's privacy rights score and privacy rights education with that respective entity user's human needs.

The industry and legal standard alpha-numeric identifier 510 for this example is industry standard is 01 and legal standard is 01, with the composite alpha-numeric identifier is 01.01. The geography alpha-number identifier 520 for this United Kingdom (UK) example is UK1, with the composite alpha-numeric identifier is 01.01.UK1. The technology platform alpha-numeric identifier 530 for this example T1, with the composite alpha-numeric identifier is 01.01.UK1.T1. The category good or service alpha-numeric identifier 540 for this example is C1, with the composite alpha-number identifier is 01.01.UK1.T1.C1. The entity alpha-numeric identifier 550 illustrates each entity individually and with the composite alpha-numeric identifier. The data processor example is DP1, with the composite alpha-numeric identifier is 01.01.UK1.T1.C1.DP1. The data controller example is DC1, with the composite alpha-numeric identifier that includes the inherited data processor (DP1) is 01.01.UK1.T1.C1.DP1DC1. The data subject example is DS1, with the composite alpha-numeric that includes the inherited data processor (DP1) and the inherited data controller (DC1) and encapsulates the user-supplied, consented and sharable demographic item(s) that matches with DP1 & DC1, the composite unique identifier is 01.01.UK1. T1.C1.DP1DC1DS1, as represented by block 545 in FIG. 5.

The method 500 illustrated in 560 includes steps 510-550 matching process plus category good or service privacy policy and terms of service list item composite alpha-numeric identifiers 560 with composite steps 561-563 for the data processor is 01.01.UK1.T1.C1.DP1, steps 564-567 for the data controller is 01.01.UK1.C1.DP1DC1, and steps 568-570 for the data subject is shown as 01.01. UK1.T1.C1.DP1DC1DS1.

In accordance with certain aspects of the present disclosure, the method 500 is initiated at step 560. At step 561, 01.01.UK1.T1.C1.DP1 is verified/not verified; liked/not liked; understood/not understood, etc., with a dynamically generated privacy score (a % such as ≤100% or a number (N)).

At step 562, list item 01.01.UK1.T1.C1.DP1 is integrated into the data processor privacy policy, cookie policy, and term(s) of use for the intended data controller, 01.01.UK1.T1.C1.DP1DC1, and the data subject, 01.01.UK1.T1.C1.DP1DC1DS1, use.

At step 563, a dynamically generated privacy score (a % such as ≤100% or a number (N)) for the data processor user is derived from the aggregation of data processor list item(s) verifications/non-verifications, likes/not likes, understoods/not understoods, etc.

At step 564, list item 01.01.UK1.T1.C1.DP1DC1 is verified/not verified; liked/not liked; understood/not understood, etc., with a dynamically generated privacy score (a % such as ≤100% or a number (N)).

At step 565, data processor and controller list item 01.01.UK1.T1.C1.DP1DC1 is paired and ordered for intended data subject use.

At step 566, 01.01.UK1.T1.C1.DP1DC1 is integrated into the data controller privacy policy, cookie policy, and term(s) of use for the intended data subject, 01.01.UK1.T1. C1.DP1DC1DS1, use.

At step 567, a dynamically generated data controller privacy score (a % such as ≤100% or a number (N)) for the data controller is derived from the aggregation of data controller list item(s) verifications/non-verifications, likes/not likes, understoods/not understoods, and the like.

At step 568, list item 01.01.UK1.T1.C1.DP1DC1DS1 is verified/not verified; liked/not liked; understood/not understood, etc. by the data subject, with a dynamically generated privacy score (a % such as ≤100% or a number (N)).

At step 569, 01.01.UK1.T1.C1.DP1DC1DS1 Privacy Score and Education Level (% or N) is optimization matched (is) to 01.01.UK1.T1.C1.DP1DC1DS1 Subsistence, Understanding and Growth, Connection and Love, Contribution, Esteem and Identity, Self-governance, Significance and Purpose (% or N).

Figure 6:
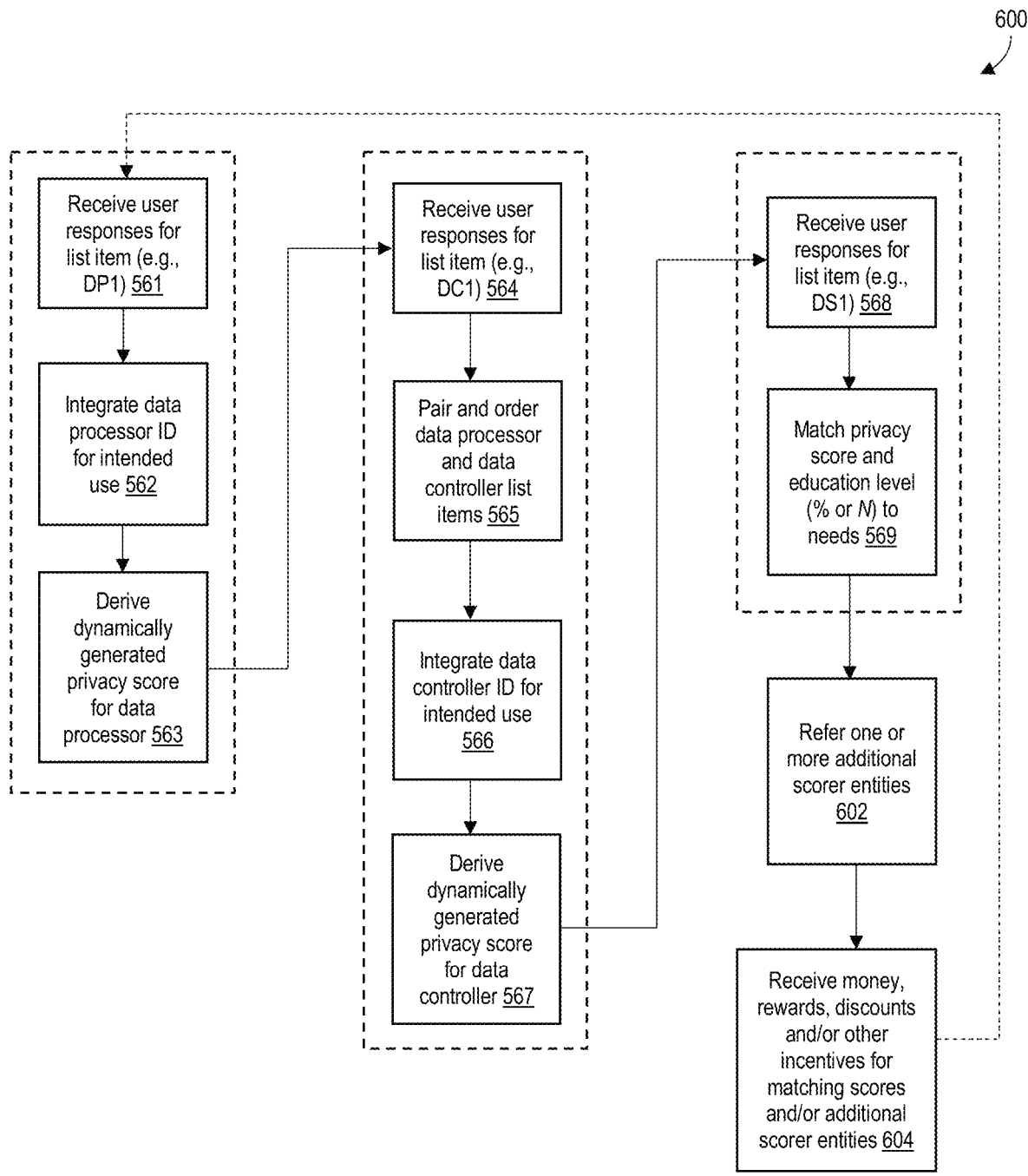
FIG. 6 illustrates a method with a matching process for a system reflecting one embodiment of the invention utilizing an exemplary composite alpha-numeric identifier.

At step 570, the method 500 ends and repeats with a feedback loop beginning at step 510. FIG. 6 illustrates a method 600 entity Educated Scorer, 01.01.UK1.T1.C1. DP1DC1DS1, upon completion of method 500 steps 510-560 becoming eligible and motivated to refer additional Scorer entity(s), such as 01.01.UK1.T1.C1.DP1DC1DS2 (Step 602) to receive money, rewards, discounts and/or other incentives for matching scores and/or additional scorer entities is N (1, 2, 3 . . . ) upon the referred additional Scorer entity(s) 01.01.UK1.T1.C1.DP1DC1DS2 (Step 604) upon completing method 500, steps 510-560, including at step 569, all entity(ies) 01.01.UK1.T1.C1.DP1DC1DS1, 01.01.UK1.T1. C1.DP1DC1DS2 . . . with each Privacy Score and Education Level and Reward and Referral (% or N) optimization matched (is) to each entity(s) 01.01.UK1.T1.C1. DP1DC1DS1, 01.01.UK1.T1.C1. DP1DC1DS2 . . . receive money, rewards, discounts, and/or other incentives that satisfy human needs for matching scores and/or for Subsistence, Understanding and Growth, Connection and Love, Contribution, Esteem and Identity, Self-governance, Significance and Purpose (% or N).

Figure 7:
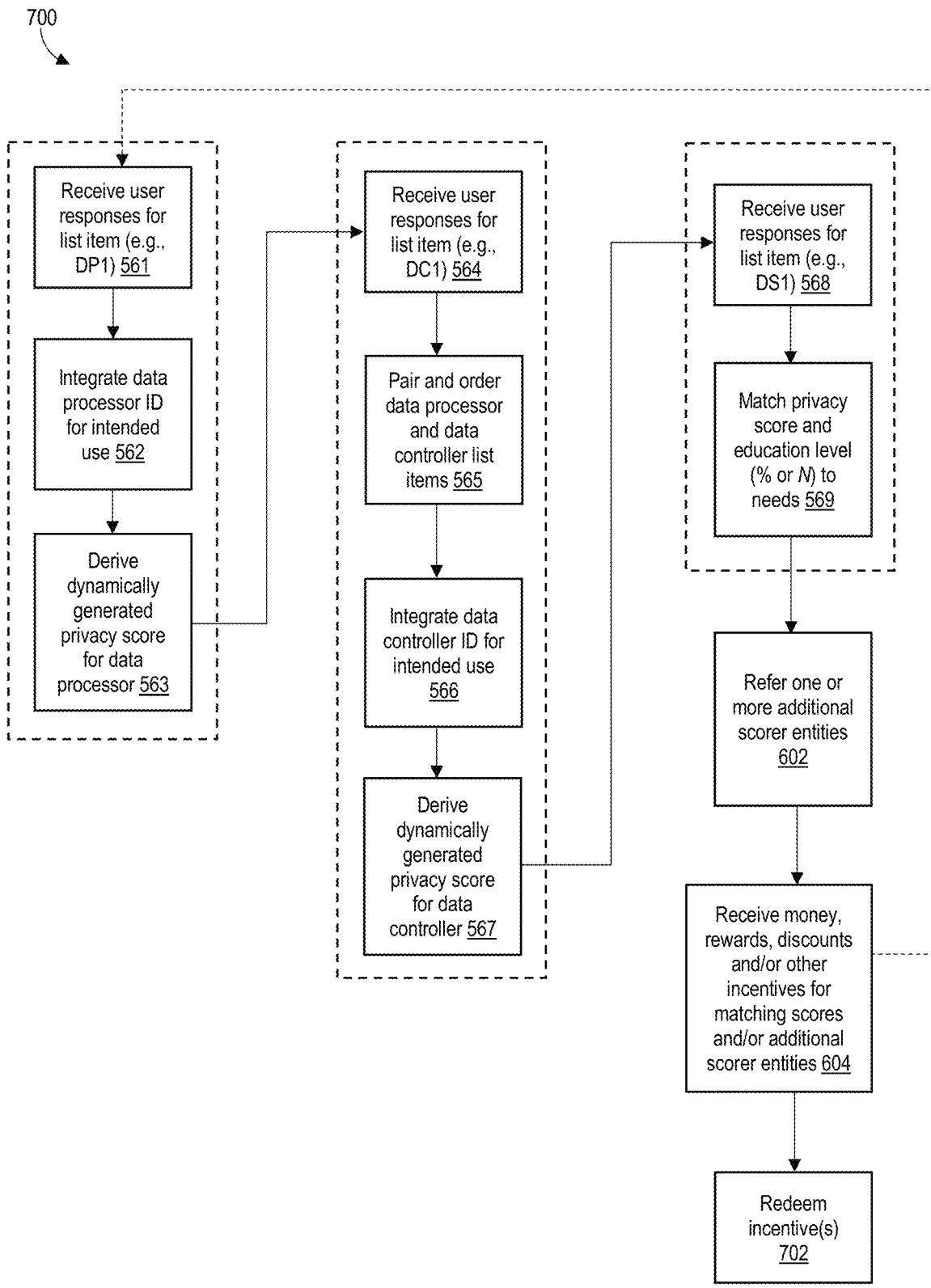
FIG. 7 illustrates a method with a matching process for a system reflecting one embodiment of the invention utilizing an exemplary composite alpha-numeric identifier.

FIG. 7 illustrates a method 700 entity Educated Scorer(s), 01.01.UK1.T1.C1.DP1DC1DS1, 01.01.UK1.T1.C1. DP1DC1DS2 . . . , upon completion of method 500 steps 510-560 by each referred entity(s) 01.01.UK1.T1.C1. DP1DC1DS . . . , using the reward points eligibility earned from referrals, method 600, redeems reward points (Step 702) with earned cash and/or cash donations used for consumption category good(s) or service(s), with each Privacy Score and Education Level, Reward and Referral, and Redeem/Consume (% or N) optimization matched (is) to all entity(ies) 01.01.UK1.T1.C1. DP1DC1DS1, 01.01.UK1. T1.C1.DP1DC1DS2 . . . Subsistence, Understanding and Growth, Connection and Love, Contribution, Esteem and Identity, Self-governance, Significance and Purpose (% or N).

FIG. 8 is a block diagram of a distributed computer system 800 providing an example, in which various aspects and embodiments of this disclosure may be implemented. The distributed computer system may include one or more computer systems. For example, as illustrated, the distributed computer system 800 includes multiple computer systems 810, 880 to 890.

System 800 may use various methods, protocols and standards including, among others, token ring, Ethernet, Wireless Ethernet, Bluetooth, radio signaling, infra-red signaling, TCIP/IP, UDP, HTTP, HTTPS, FTP, SNMP, SMS, MMS, RCS, SS7, JSON, XML, REST, SOAP, CORBA HOP, RMI, DCOM and Web Services.

According to some embodiments, the functions and operations discussed for producing a three-dimensional synthetic viewpoint can be executed on computer systems 810 individually or in combination. For example, the computer systems 810, 880, 890 support, for example, participation in a collaborative network. In one alternative, a single computer system (e.g., 810) can generate the three-dimensional synthetic viewpoint. The computer systems 810, 880, 890 may include servers or services consumed on cloud.

Various aspects and functions in accord with embodiments discussed herein may be implemented as specialized hardware or software executing in one or more computer systems including the computer systems shown in FIGS. 1-2.

Systems in 805 represent the point of presence systems present in the ecosystem of 800, which can be any form of intelligent (special purpose computing devices such as shop beacons) or passive devices (such as passive RFID tags, barcodes etc.). 805 system captures the user entity 120's consumption of the Logo's services in the physical space or online space. This provides validated data point to access the SUCCESS model. Systems in 805 communicate with systems in 810, 880, 890 through various network and services interfaces depicted by 845 and 230 with respect to user device 102.

The following components can reside on a particular server or can be consumed as service using any of the cloud services. These components can be on computer system 800 or spread over 880 to 890.

In one embodiment, the computing system consists of 815 which provides the required network/service interface for 110 to interact with the backend. It can be native calls, RESTFul/SOAP calls, Stream pushes. 815 also encompasses the business logic, Functions, Jobs to achieve the optimization matching model(s) of S.E.R.R.R. equal to S.U.C. C.E.S.S.R. 815 interacts with rest of the system and outside services through the system of communication, protocols, methodologies represented by 840, 840 consists of the following but it is not limited to usage of Service bus, data storage services, various Service libraries and APIs which are native of 810, or third party vendors or cloud service providers; 815 derives its intelligence through making use of cognitive services 835 and machine learning services 830; these are needed to support the intelligence depicted by component 225 in the application 110 (see FIG. 2) which runs on User entity's device 102. 840 also glues the flows of communication 855 through various notification methodologies such as WebSocket, SMS, using various protocols and it also plays a role in data storage along with native protocols and methodologies. System 810 has various forms of data stores represented by 850 but not limited to SQL, no SQL, Blob persistent data storage. 820 represents Authorization and Authentication in the system 800 and also it provides various permission support to element 110 in FIG. 2 and element 805. System 810 includes various data transfer protocols and standards including, but not limited to, http, https, ws, web socket, NF/RFID, TCP/IP, Zigbee, iBeacon, Bluetooth, low power Bluetooth, XML, SOAP, RESTful, MQTT, Streams, GraphQL, SQL, no SQL and the like. System 810 may include various notification protocols including, but not limited to, email, WebSocket, voice calls; 3G, 4G LTE, 5G, accessibility standards, and the like.

S.E.R.R.R. model is implemented through Education Certification Engine 825, which encompasses server-based User level privacy score certification generation, certificate validation systems, certificate sharing (not limited to social media, professional media) and distribution through various means.

Another aspect is the application 110 can be made available through an "app store" for download or purchase, once installed or made available for execution, computer system 810 can be specifically configured to execute the functions associated with producing the functionality required on 110 either through the install model or through the browser model.

In some embodiments, the computer system 810,880,890 may include an operating system that manages at least a portion of the hardware components (e.g., input/output devices, touch screens, cameras, etc.) included in computer system 810,880,890. One or more processors or controllers, such as processor 810, may execute an operating system which may be, among others, a Windows-based operating system available from Microsoft Corporation, an operating system available from Apple Corporation (e.g., MAC OS, including System X), one of many Linux-based operating system distributions (for example, the Enterprise Linux operating system available from Red Hat Inc.), a Solaris operating system available from Oracle Corporation, or a UNIX operating system available from various sources. Many other operating systems may be used, including operating systems designed for personal computing devices, smartphones, tablets, or wearables (e.g., iOS or Android on user device 102) and embodiments are not limited to any particular operating system.

Figure 9:
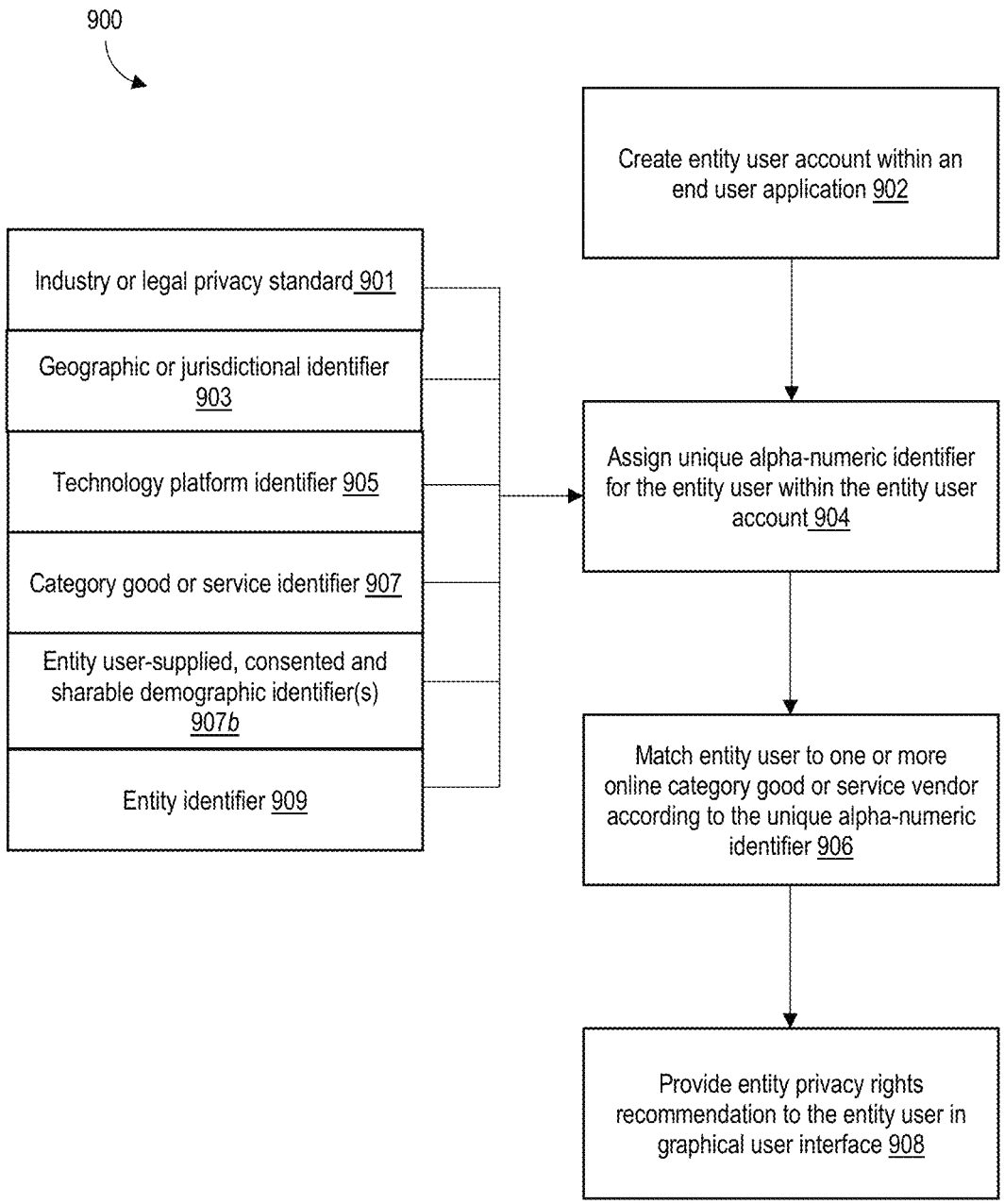
FIG. 9 is a block diagram of a method for dynamically optimizing online privacy recommendations for entity users, in accordance with certain aspects of the present disclosure.

FIG. 9 is a block diagram of a method 900 for dynamically optimizing online privacy recommendations for entity users. In accordance with certain aspects of the present disclosure, method 900 may be embodied as one or more system routines or operations of system 100 (as shown in FIG. 1) and/or system 800 (as shown in FIG. 8). In accordance with certain aspects of the present disclosure, method 900 may be sequential to one or more steps or operations (including one or more sub-steps or sub-operations) for one or more of method 300 (as shown in FIG. 3), method 400 (as shown in FIG. 4), method 500 (as shown in FIG. 5), method 600 (as shown in FIG. 6) and/or method 700 (as shown in FIG. 7). In accordance with certain aspects of the present disclosure, method 900 may be initiated by executing one or more steps or operations for creating, with at least one processor, an entity user account within an end user application comprising a graphical user interface configured to display one or more privacy rights education prompt and an entity user privacy score (Step 902). In certain embodiments, the entity user account is associated with an entity user of the end user application for optimizing one or more online privacy recommendations for an entity user. Method 900 may proceed by executing one or more steps or operations for assigning, with the at least one processor, a unique alpha-numeric identifier for the entity user within the entity user account (Step 904). In accordance with certain embodiments, the unique alpha-numeric identifier may comprise a composite identification of an industry or legal privacy standard 901, a geographic or jurisdictional identifier 903, a technology platform identifier 905, a category good or service identifier 907, one or more entity user-supplied, consented and sharable demographic item(s) identifier 907b and an entity identifier 909. Method 900 may proceed by executing one or more steps or operations for matching, with the at least one processor, the entity user to one or more online category good or service vendor according to the unique alpha-numeric identifier (Step 906). In accordance with certain aspects of the present disclosure, method 900 may conclude upon executing one or more steps or operations for providing, with the at least one processor via the graphical user interface, the entity privacy rights recommendation comprising the one or more online category goods or services vendor matched to the entity user (Step 908). In certain embodiments, the entity privacy rights recommendation may include a link for a uniform resource locator for a webpage associated with the one or more online category good or service vendor. In certain embodiments, method 900 include one or more steps or operations for generating, with the at least one processor, a privacy index value for the one or more online category good or service vendor according to the at least one machine learning framework, wherein the privacy index value is directly or inversely correlated to one or more industry parameters for the one or more online category good or service vendor. In certain embodiments, the one or more industry parameters may comprise one or more of a privacy regulation parameter, an adverse legal or regulatory action parameter, a security or privacy-related incident or breach parameter, and a consumer satisfaction or consumer confidence parameter.

In accordance with certain aspects of the present disclosure, method 900 may include one or more steps or operations for analyzing, with the at least one processor, at least one online privacy policy or online terms of service for the one or more online category good or service vendor according to at least one machine learning framework to generate the composite identification of one or more of the industry or legal privacy standard, the geographic or jurisdictional identifier, the technology platform identifier, and the category good or service identifier. In certain embodiments, method 900 include one or more steps or operations for presenting, with the at least one processor via the graphical user interface, a one or more user prompts associated with one or more online category good or service list item to the entity user, wherein the one or more user prompts comprise one or more privacy education prompts. Method 900 may further include one or more steps or operations for receiving, with the at least one processor via the graphical user interface, one or more user-generated inputs in response to the one or more user prompts and processing, with the at least one processor, the one or more user-generated inputs in response to the one or more user prompts to generate the entity user privacy score. In accordance with certain aspects of the present disclosure, method 900 may include one or more steps or operations for analyzing, with the at least one processor, the entity user privacy score and the unique alpha-numeric identifier to match the entity user to the one or more online category goods or services vendor and presenting, with the at least one processor via the graphical user interface, a one or more subsequent user prompts associated with the one or more online category good or service list item to the entity user, wherein the one or more subsequent user prompts comprise one or more subsequent privacy education prompts. In accordance with certain aspects of the present disclosure, method 900 may include one or more steps or operations for receiving, with the at least one processor via the graphical user interface, one or more subsequent user-generated inputs in response to the one or more subsequent user prompts and processing, with the at least one processor, the one or more subsequent user-generated inputs to generate an updated entity user privacy score. In accordance with certain aspects of the present disclosure, method 900 may include one or more steps or operations for analyzing, with the at least one processor, the updated entity user privacy score and the unique alpha-numeric identifier to provide an updated entity privacy rights recommendation to the entity user via the graphical user interface of the end user application.

In accordance with certain aspects of the present disclosure, method 900 may further include one or more steps or operations for tracking, with the at least one processor, one or more online transaction associated with the link for the uniform resource locator for the webpage associated with the one or more online category good or service vendor. In accordance with certain aspects of the present disclosure, method 900 may include one or more steps or operations for providing, with the at least one processor via the graphical user interface, one or more financial rewards to the entity user in response to the one or more online transaction associated with the link for the uniform resource locator for the webpage associated with the one or more online category good or service vendor. In accordance with certain aspects of the present disclosure, method 900 may include one or more steps or operations for providing, with the at least one processor via the graphical user interface, at least one social sharing link associated with the entity user account to the entity end user. In accordance with certain aspects of the present disclosure, method 900 may include one or more steps or operations for tracking, with the at least one processor, one or more social sharing event associated with the at least one social sharing link associated with the entity user account and providing, with the at least one processor via the graphical user interface, one or more financial rewards to the entity user in response to the one or more social sharing event.

Figure 10:
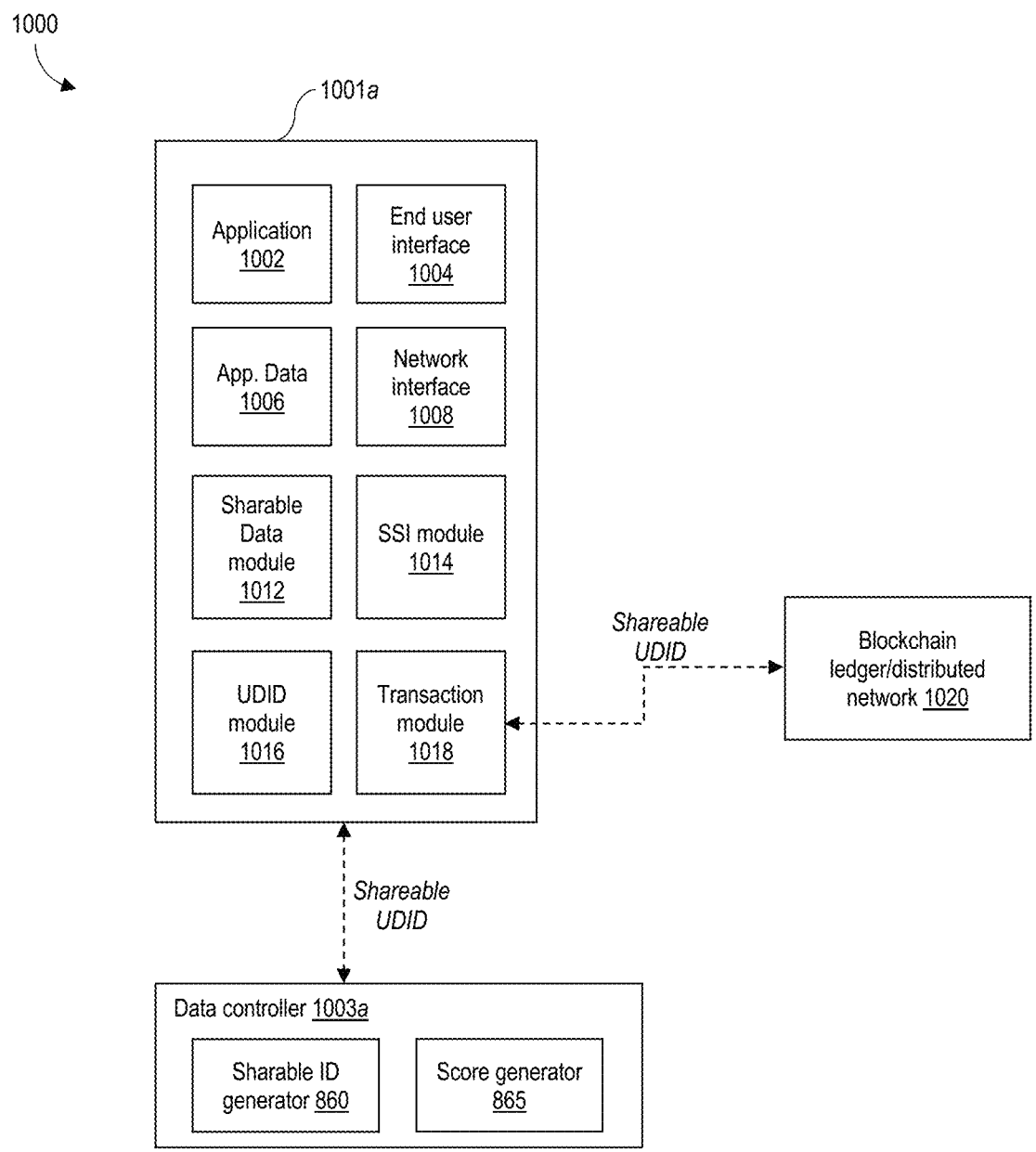
FIG. 10 is a functional block diagram of an online user privacy system, in accordance with certain aspects of the present disclosure.

Referring now to FIG. 10, a functional block diagram of an online user privacy and transaction system 1000 is shown. In accordance with certain aspects of the present disclosure, system 1000 may comprise an embodiment of system 100, as shown and described in association with FIG. 1. In accordance with certain aspects of the present disclosure, system 1000 may be comprised of an end user computing environment 1001a, a data controller computing environment 1003a, and a blockchain ledger 1020. Blockchain ledger 1020 may comprise a distributed computing environment comprising a plurality of shared databases that are linked in a peer-to-peer network to facilitate a blockchain architecture. In accordance with certain aspects of the present disclosure, end user computing environment 1001a may be configured as an end user device (e.g., a smart phone or personal computer) and/or may comprise a networked configuration of two or more networked devices (e.g., a smart phone and one or more remote servers). In certain embodiments, end user computing environment 1001a comprises an end user application 1002, an end user interface 1004 (e.g., a graphical user interface), an application data store or database 1006 (e.g., a non-transitory computer readable storage medium), and a network interface 1008 (e.g., a network communications interface). In certain embodiments, end user application 1002 may comprise an embodiment of application component 110, as shown and described in FIG. 1. End user interface 1004 may comprise an embodiment of UI component 220 as shown and described in FIG. 2. In accordance with certain embodiments, end user computing environment 1001a may comprise a plurality of computing modules 1012-1018 for facilitating one or more operations of the online user privacy and transaction system 1000. In certain embodiments, end user computing environment 1001a may comprise a shareable data module 1012, a self-sovereign identity (SSI) module 1014, a user de-identified identity (UDID) module 1016, and a transaction module 1018. In accordance with certain aspects of the present disclosure, shareable data module 1012 may comprise one or more computing modules configured to execute one or more operations for storing and managing a plurality of personally identifiable information (PII) (e.g., demographic information) for an entity user. The entity user may comprise an end user of end user application 1002. SSI module 1014 may comprise one or more computing modules configured to execute one or more operations for generating, managing and/or storing a self-sovereign identifier (SSID) for the entity user. The SSID may comprise a unique authentication access key for the entity user. In accordance with certain aspects of the present disclosure, the SSID may be configured as an authentication key and/or cryptographic key for authenticating the identity of the entity user in order to executed one or more transactions and/or authorize one or more operations of system 1000. UDID module 1016 may comprise one or more computing modules configured to execute one or more operations for managing and sharing a unique identifier (e.g., an alpha-numeric value) comprising a UDID for the entity user. Transaction module 1018 may comprise one or more computing modules configured to execute one or more operations for managing and storing a plurality of transaction data associated with the entity user. In certain embodiments, transaction module 1018 may be configured to assign/manage one or more anonymized identifiers for each transaction stored in transaction module 1018. In certain embodiments, transaction module 1018 may be configured to assign unique identification codes and metadata to transaction data in order to create a non-fungible token (or other digital asset) for each transaction and/or a group of transactions associated with the entity user.

In accordance with certain aspects of the present disclosure, data controller computing environment 1003*a* may comprise an embodiment of distributed computer system 800, as shown and described in FIG. 8. Data controller computing environment 1003*a* may be configured as a networked server and may be communicably engaged with end user computing environment 1001*a* via a network communications interface. In accordance with certain embodiments, data controller computing environment 1003*a* may comprise a sharable ID generator module 860 and a privacy score generator module 865. In certain embodiments, sharable ID generator module 860 may be configured to execute one or more operations for generating the unique UDID for the entity user. In certain embodiments, privacy score generator module 865 may be configured to execute one or more operations for processing a plurality of user-generated data and a plurality of online seller/brand data in order to generate one or more privacy score for the entity user and/or privacy index value for one or more online vendor. In certain embodiments, privacy score generator module 865 may be configured to execute one or more operations for analyzing at least one online privacy policy or online terms of service for one or more online category good or service vendor and entity user-supplied, consented, and sharable demographic item(s) according to at least one machine learning framework to generate the privacy index value. In accordance with certain aspects of the present disclosure, end user computing environment 1001*a* may be configured to execute one or more steps or operations for sharing the UDID for the entity user between data controller computing environment 1003*a* and/or blockchain ledger 1020 in order to authenticate the entity user's anonymized identity and authorize one or more transactions/operations between end user computing environment 1001*a* and data controller computing environment 1003*a* and/or blockchain ledger 1020.

In accordance with certain aspects of the present disclosure, end user application 1002 may be configured to render one or more prompts or workflows (e.g., via end user interface 1004) to establish an end user account for the entity user. The one or more prompts or workflows may comprise one or more graphical elements comprising one or more privacy education prompts (e.g., as described above) and/or one or more user demographic prompts. The one or more user demographic prompts may comprise one or more PII descriptors such as, but not limited to, Annual/Monthly/Weekly/Daily Income, Highest Educational Attainment, Gender, Ethnicity, Purchase Zip Code, Date of Birth, Marital Status, Number of Dependents, Daily/Weekly/Monthly/Annual Category Spend, Category Brand Preferences, Category Goods and Services Historical Purchases, and the like. End user application 1002 may be configured to receive a plurality of user-generated inputs comprising user responses to the privacy education prompts and a plurality of demographic data for the end user. In accordance with certain embodiments, sharable data module 1012 may be configured to securely store the plurality of demographic data for the end user. In accordance with certain embodiments, sharable data module 1012 may be configured to enable the end user to configure one or more parameters for sharing their personal data. For example, sharable data module 1012 may comprise one or more configurable sharing parameters according to geographic region, data privacy policy and online terms of use, financial regulations, data security standards and/or data privacy laws. End user computing environment 1001*a* may be configured to communicate the plurality of user-generated inputs, in response to an express consent by the end user received via end user interface 1004, to data controller computing environment 1003*a*. Data controller computing environment 1003*a* may be configured to process the plurality of user-generated inputs (e.g., via a data processing framework of score generator module 865) to generate a privacy score for the end user. In accordance with certain aspects of the present disclosure, the data processing framework is configured to assign unique weights or values to each PII descriptor such that each aspect of the end user's demographic data has an impact (e.g., positive or negative) on the end user's privacy score (e.g., as described herein). In certain embodiments, the end user's demographic data may be analyzed (e.g., according to the data processing framework) to update a pre-existing (e.g., previously calculated) privacy score for the end user. In accordance with certain aspects of the present disclosure, data controller computing environment 1003*a* is configured to analyze the privacy score to match the entity user to one or more online category good or service vendor.

In accordance with certain aspects of the present disclosure, still in reference to FIG. 10, SSI module 1014 is configured to manage/store a unique authentication access key (e.g., an SSID) associated with the entity user's account. In certain embodiments, the SSID is stored locally on the end user device (e.g., a smart phone or personal computer). The end user's demographic data may also be stored locally on the end user's device. In accordance with certain aspects of the present disclosure, the UDID may comprise a linking ID for authenticating a user computing session between end user computing environment 1001*a* and data controller computing environment 1003*a*. The end user may share the UDID with data controller computing environment 1003*a* to instantiate a consented computing session to share one or more data set residing in end user computing environment 1001*a* (e.g., the personal demographic data). The UDID may serve as a linking ID to anonymously identify the entity user while transferring the entity user's demographic data to/from data controller computing environment 1003*a* and/or one or more other distributed computing systems configured to run in a centralized and/or decentralized system environment. In accordance with certain aspects of the present disclosure, transaction module 1018 may be configured to store data associated with each consented user computing session on blockchain network 1020 to create an audit trail and/or ledger of consented user computing sessions between end user computing environment 1001*a* and data controller computing environment 1003*a*.

Figure 11:
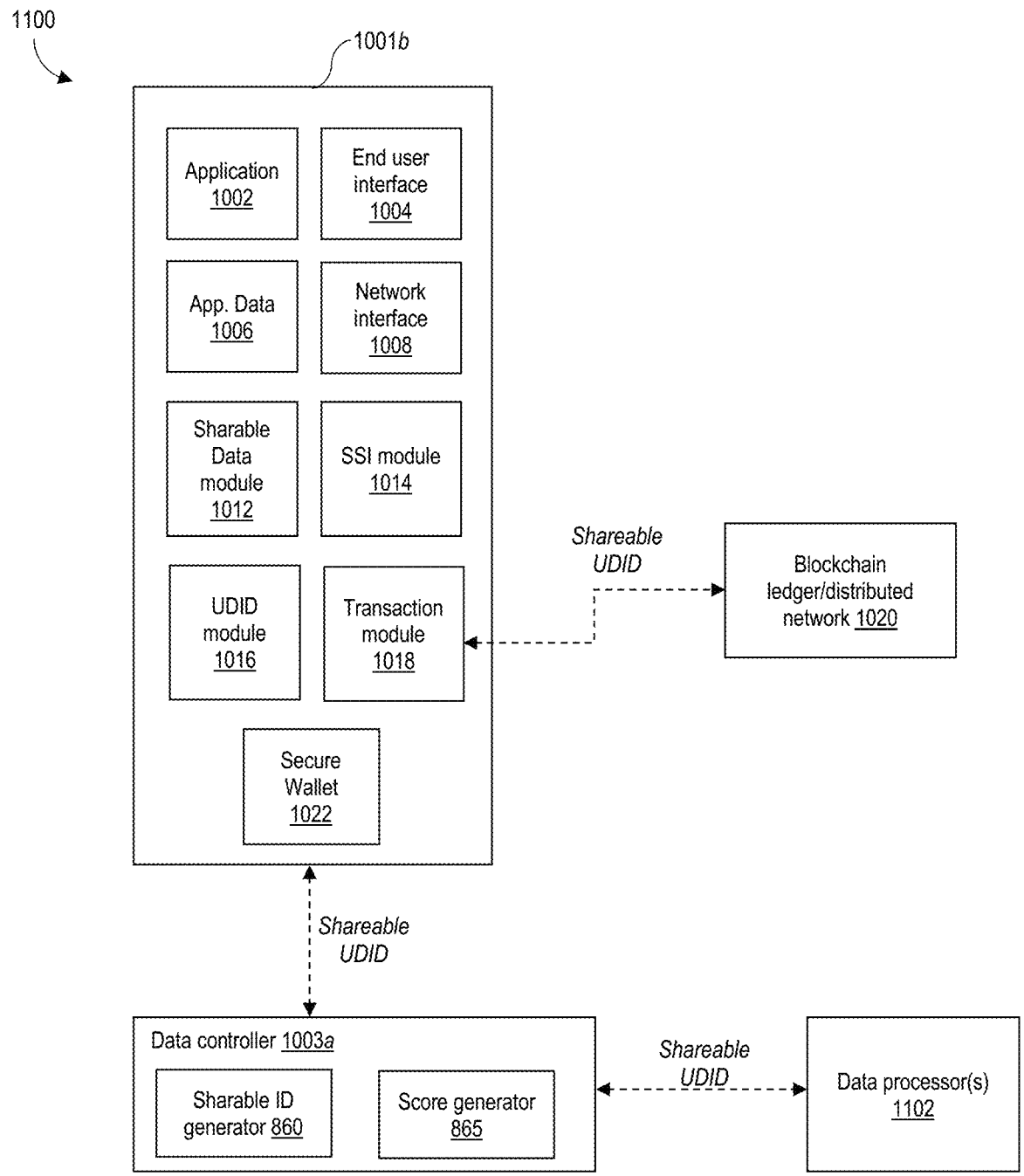
FIG. 11 is a functional block diagram of an online user privacy system, in accordance with certain aspects of the present disclosure.

Referring now to FIG. 11, a functional block diagram of an online user privacy and transaction system 1100 is shown. For the sake of brevity, like elements between FIG. 11 and prior figures may not be discussed in detail below. In accordance with certain aspects of the present disclosure, system 1100 comprises an alternative embodiment of system 1000, as shown and described in association with FIG. 10. System 1100 may comprise an embodiment of system 100, as shown and described in association with FIG. 1. System 1100 may comprise end user computing environment 1001*b*, data controller computing environment 1003*a*, blockchain ledger 1020 and one or more data processors 1102. In accordance with certain embodiments, end user computing environment 1001*b* may be equivalent to end user computing environment 1001a, with the addition of a secure digital wallet module 1022. Secure digital wallet module 1022 may comprise a software module configured to store one or more digital assets (e.g., digital currency, NFTs, etc.) and facilitate one or more electronic transactions to send and/or receive one or more digital assets (e.g., digital currency, NFTs, etc.) to/from secure digital wallet module 1022.

In accordance with certain aspects of the present disclosure, system 1100 is configured to facilitate one or more electronic transactions between end user computing environment 1001b and the one or more data processor 1102. In certain embodiments, one or more data processor 1102 may comprise one or more entity user digital financial accounts, payment accounts, bank accounts, investment accounts, and/or other types of digital financial accounts. In accordance with said embodiments, end user computing environment 1001b may execute one or more steps or operations (e.g., in response to one or more user inputs at end user interface 1004) to share the UDID to instantiate a consented computing session between end user computing environment 1001b and data controller computing environment 1003a. In certain use cases, the consented computing session may be configured to execute one or more digital transaction. Data controller computing environment 1003a may be configured to process the UDID (e.g., via sharable ID generator module 860) to anonymously identify the entity user to facilitate the digital transaction. In accordance with certain aspects of the present disclosure, data controller computing environment 1003a may serve as a broker between end user computing environment 1001b and the one or more data processor 1102. End user computing environment 1001b may be configured to facilitate one or more digital transaction between end user computing environment 1001b (e.g., via secure digital wallet module 1022) and the one or more data processor 1102 in response to one or more user commands received at end user interface 1004. In accordance with certain aspects of the present disclosure, system 1100 enables a secure, private (i.e., de-identified) digital transaction between the entity user (e.g., via end user computing environment 1001b) and the one or more data processor 1102 (e.g., one or more entity user digital financial accounts, payment accounts, bank accounts, investment accounts, and/or other types of digital financial accounts). In accordance with certain aspects of the present disclosure, transaction module 1018 may be configured to store data associated with each consented user computing session on blockchain network 1020 to create an audit trail and/or ledger of consented user computing sessions between end user computing environment 1001a and data controller computing environment 1003a. In accordance with certain aspects of the present disclosure, transaction module 1018 may be configured to generate a non-fungible token (NFT) containing transaction data for each digital currency transaction. Transaction module 1018 may be configured to mint an NFT to blockchain ledger 1020 for each transaction by/between secure digital wallet module 1022 and the one or more data processor 1102.

Figure 12:
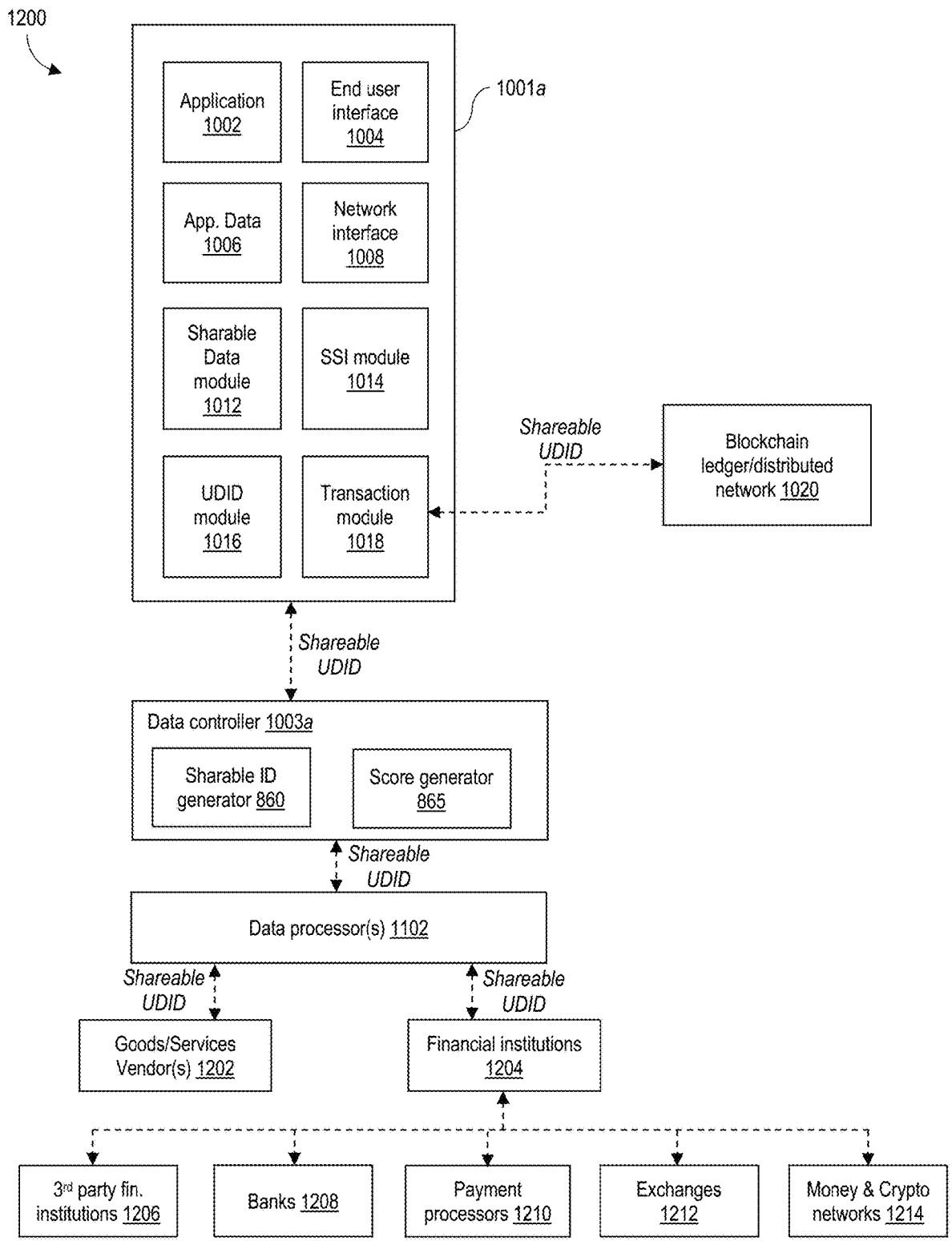
FIG. 12 is a functional block diagram of an online user privacy system, in accordance with certain aspects of the present disclosure.

Referring now to FIG. 12, a functional block diagram of an online user privacy and transaction system 1200 is shown. For the sake of brevity, like elements between FIG. 12 and prior figures may not be discussed in detail below. In accordance with certain aspects of the present disclosure, system 1200 may comprise an alternative embodiment of system 1000, as shown and described in association with FIG. 10, and/or an alternative embodiment of system 1100, as shown and described in association with FIG. 11. System 1200 may comprise an embodiment of system 100, as shown and described in association with FIG. 1. System 1200 may comprise end user computing environment 1001a, data controller computing environment 1003a, blockchain ledger 1020 and one or more data processors 1102. In accordance with certain aspects of the present disclosure, system 1200 may facilitate one or more physical or digital transaction(s) between end user computing environment 1001a and one or more goods or services vendor 1202 and/or financial institution(s) 1204. Financial institutions 1204 may comprise one or more third-party financial institutions 1206, banks 1208, payment processors 1210, financial exchanges 1212 (e.g., securities/commodities) and/or currency or cryptocurrency networks 1214.

In accordance with said embodiments, end user computing environment 1001a may execute one or more steps or operations (e.g., in response to one or more user inputs at end user interface 1004) to share the UDID with data controller computing environment 1003a to instantiate a consented computing session between end user computing environment 1001a and data controller computing environment 1003a. Upon authenticating the UDID, data controller computing environment 1003a may be configured to receive/process one or more user data sets from end user computing environment 1001a. The one or more user data sets may comprise one or more user demographic data, privacy list item data, transaction data, digital currency, currency transfer, NFT transaction data, and the like. In accordance with certain aspects of the present disclosure, data controller computing environment 1003a may be configured to process the one or more sets of user data (e.g., according to at least one data processing framework) to provide one or more matching score, reward, offer, and/or recommendation for one or more goods or services vendor 1202 and/or financial institution(s) 1204. End user computing environment 1001a may be configured to display the one or more matching score, reward, offer, and/or recommendation at end user interface 1004. In accordance with certain aspects of the present disclosure, the entity user may execute a transaction with one or more goods or services vendor 1202 and/or financial institution(s) 1204 based on the one or more matching score, reward, offer, and/or recommendation. Data controller computing environment 1003a may act as a broker to share the user's UDID between data processors 1102 and the one or more goods or services vendor 1202 and/or financial institution(s) 1204 and facilitate the transaction. In accordance with certain aspects of the present disclosure, system 1200 enables an entity user to execute the transaction with one or more goods or services vendor 1202 and/or financial institution(s) 1204 without sharing sensitive PII with the one or more goods or services vendor 1202 and/or financial institution(s) 1204, thereby enabling enhanced privacy and data security. In accordance with certain aspects of the present disclosure, transaction module 1018 may be configured to store data associated with each consented user computing session on blockchain network 1020 to create an audit trail and/or ledger of consented user computing sessions between end user computing environment 1001a and data controller computing environment 1003a. In accordance with certain aspects of the present disclosure, transaction module 1018 may be configured to generate a non-fungible token (NFT) containing transaction data for each transaction with one or more goods or services vendor 1202 and/or financial institution(s) 1204. Transaction module 1018 may be configured to mint an NFT to blockchain ledger 1020 for each transaction by/between end user computing environment 1001a and the one or more goods or services vendor 1202 and/or financial institution(s) 1204.

Figure 13:
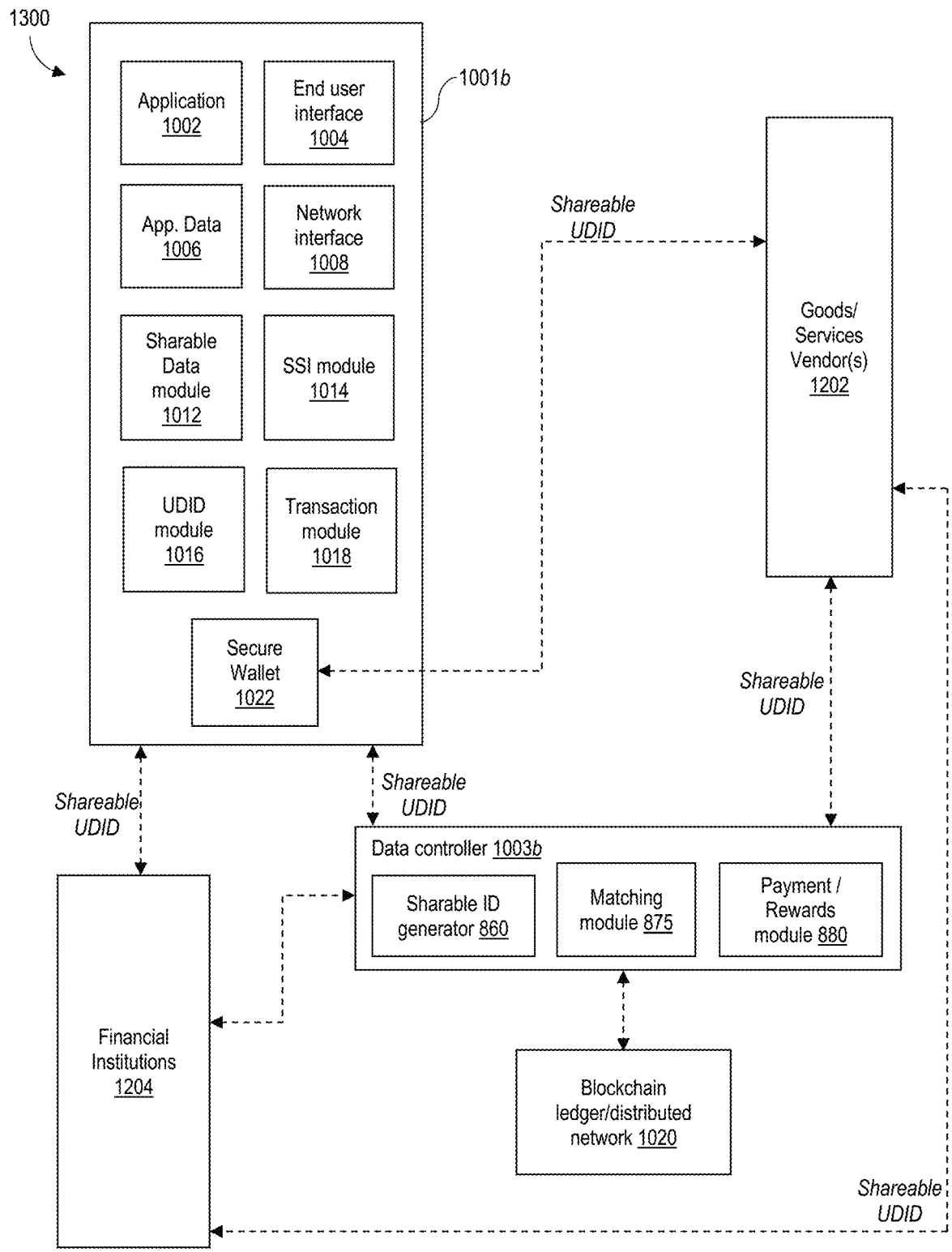
FIG. 13 is a functional block diagram of an online user privacy system, in accordance with certain aspects of the present disclosure.

Referring now to FIG. 13, a functional block diagram of an online user privacy and transaction system 1300 is shown. For the sake of brevity, like elements between FIG. 13 and prior figures may not be discussed in detail below. In accordance with certain aspects of the present disclosure, system 1300 may comprise an alternative embodiment of system 1000, as shown and described in association with FIG. 10, and/or an alternative embodiment of system 1100, as shown and described in association with FIG. 11, and/or an alternative embodiment of system 1200, as shown and described in association with FIG. 12. System 1300 may comprise an embodiment of system 100, as shown and described in association with FIG. 1. System 1300 may comprise end user computing environment 1001b, data controller computing environment 1003b, blockchain ledger 1020, one or more goods or services vendor 1202 and/or financial institution(s) 1204. In accordance with certain aspects of the present disclosure, system 1300 enables an entity user account to uniquely receive rewards and/or uniquely provide payments to/from one or more goods or services vendor 1202 and/or financial institution(s) 1204 securely and privately (i.e., in a de-identified manner) via the user's UDID as a form of identity and account verification. In accordance with certain aspects of the present disclosure, system 1300 enables an entity user to execute one or more digital transactions (e.g., with secure digital wallet module 1022) utilizing multiple forms of digital currency or cryptocurrency including, but not limited to, BITCOIN, BITCOIN exchanged to fiat currency(s), stablecoin (e.g., cryptocurrency with a value that is pegged to another asset), BITCOIN exchange traded funds (ETFs), and other forms of purchasing or rewards currency(s).

In accordance with certain aspects of the present disclosure, data controller computing environment 1003b may comprise an embodiment of distributed computer system 800, as shown and described in FIG. 8. In accordance with certain embodiments, data controller computing environment 1003b may comprise sharable ID generator 860, a matching module 875, and a payments/rewards module 880. Matching module 875 may be configured to execute a plurality of operations for analyzing the user's privacy score (e.g., including the user's demographic data) and the privacy index values for one or more goods or services vendor 1202 and/or financial institution(s) 1204 to match the one or more goods or services vendor 1202 and/or financial institution(s) 1204 to the entity user based on user privacy preferences and demographic data. Payments/rewards module 880 may be configured to execute a plurality of operations for facilitating one or more transactions and/or delivering one or more rewards between end user computing environment 1001b and one or more goods or services vendor 1202 and/or financial institution(s) 1204. In accordance with certain aspects of the present disclosure, transaction module 1018 may be configured to store data associated with each consented user computing session on blockchain network 1020 to create an audit trail and/or ledger of consented user computing sessions between end user computing environment 1001b and data controller computing environment 1003b. In accordance with certain aspects of the present disclosure, transaction module 1018 may be configured to generate a non-fungible token (NFT) containing transaction data for each transaction with one or more goods or services vendor 1202 and/or financial institution(s) 1204. Transaction module 1018 may be configured to mint an NFT to blockchain ledger 1020 for each transaction by/between end user computing environment 1001b and the one or more goods or services vendor 1202 and/or financial institution(s) 1204.

Figure 14:
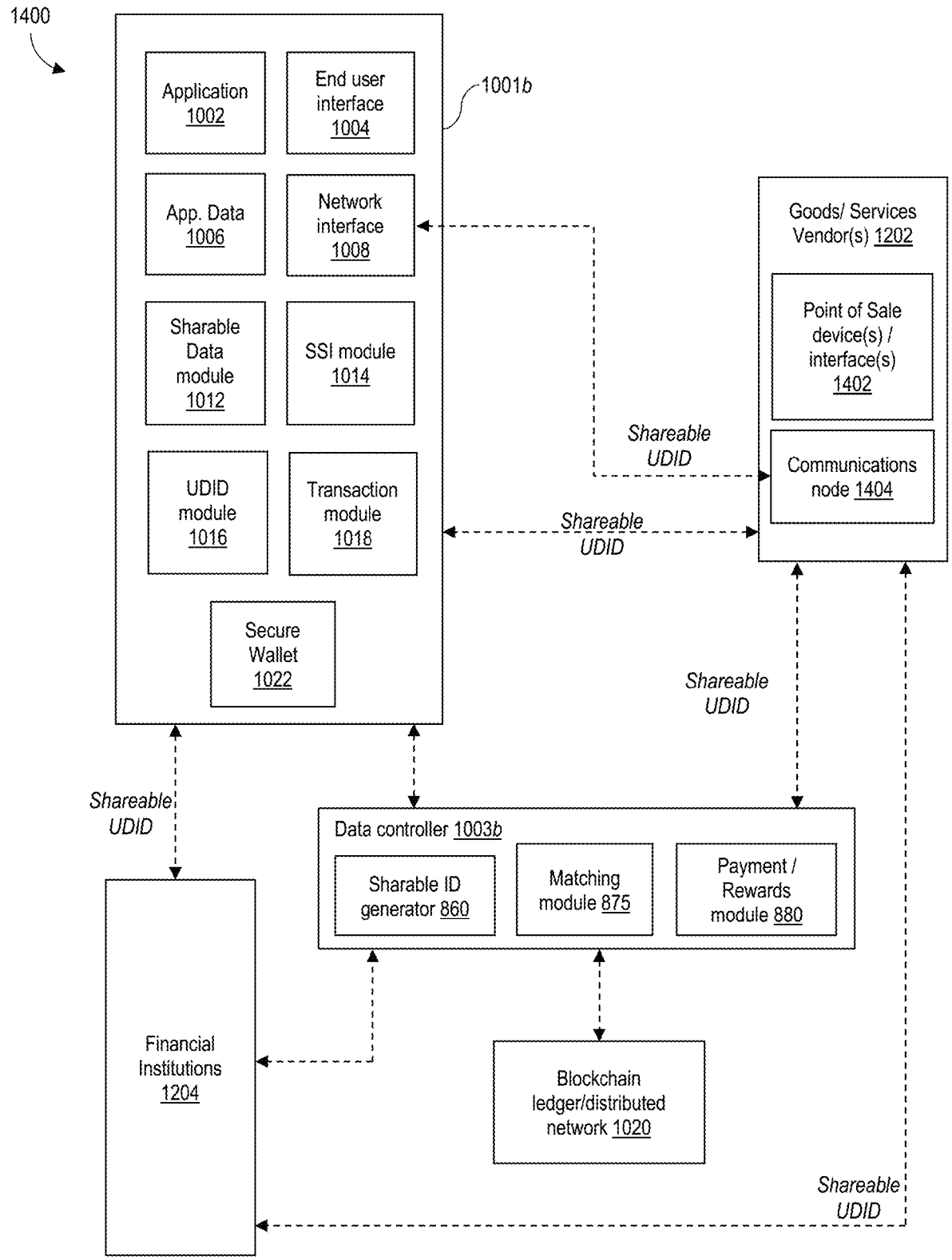
FIG. 14 is a functional block diagram of an online user privacy system, in accordance with certain aspects of the present disclosure.

Referring now to FIG. 14, a functional block diagram of an online user privacy and transaction system 1400 is shown. For the sake of brevity, like elements between FIG. 14 and prior figures may not be discussed in detail below. In accordance with certain aspects of the present disclosure, system 1400 may comprise an alternative embodiment of system 1000, as shown and described in association with FIG. 10, and/or an alternative embodiment of system 1100, as shown and described in association with FIG. 11, and/or an alternative embodiment of system 1200, as shown and described in association with FIG. 12, and/or an alternative embodiment of system 1300, as shown and described in association with FIG. 13. System 1400 may comprise an embodiment of system 100, as shown and described in association with FIG. 1. System 1400 may comprise end user computing environment 1001b, data controller computing environment 1003b, blockchain ledger 1020, one or more goods or services vendor 1202 and/or financial institution(s) 1204. In accordance with certain aspects of the present disclosure, system 1400 enables an entity user account to uniquely receive rewards and/or uniquely provide payments to/from one or more goods or services vendor 1202 and/or financial institution(s) 1204 securely and privately (i.e., in a de-identified manner) via the user's UDID as a form of identity and account verification. In accordance with certain aspects of the present disclosure, one or more goods or services vendor 1202 may comprise a "brick-and-mortar" retail location comprising one or more point-of-presence or point-of-sale devices/interfaces 1402 and one or more communication node 1404. The point-of-sale devices/interfaces 1402 may comprise one or more credit card terminals, RFID tags, BLUETOOTH beacons, NFC interfaces, camera systems (e.g., with facial/image recognition technology), optical scanning devices (e.g., barcodes, QR codes, etc.) and the like. System 1400 may be configured to enable an entity user to account for a plurality of online and/or offline transactions with one or more goods or services vendor 1202. In accordance with certain embodiments, the entity user may share the UDID with goods or services vendor 1202 via an interface between network interface 1008 and communication node 1404 to establish a consented data transfer interface for sharing transaction data and/or user data/preferences. In accordance with certain embodiments, transaction data may be shared via multiple modalities including, but not limited to, QR codes (e.g., via an optical scanner), RFID tags, URL addresses/links (for online purchases), receipt uploads (e.g., via a camera system), and the like. In accordance with certain aspects of the present disclosure, transaction module 1018 may be configured to store data associated with each consented user computing session on blockchain network 1020 to create an audit trail and/or ledger of consented user computing sessions between end user computing environment 1001b and data controller computing environment 1003b. In accordance with certain aspects of the present disclosure, transaction module 1018 may be configured to generate a non-fungible token (NFT) containing transaction data for each transaction with one or more goods or services vendor 1202 and/or financial institution(s) 1204. Transaction module 1018 may be configured to mint an NFT to blockchain ledger 1020 for each transaction by/between end user computing environment 1001b and the one or more goods or services vendor 1202 and/or financial institution(s) 1204.

Figure 15:
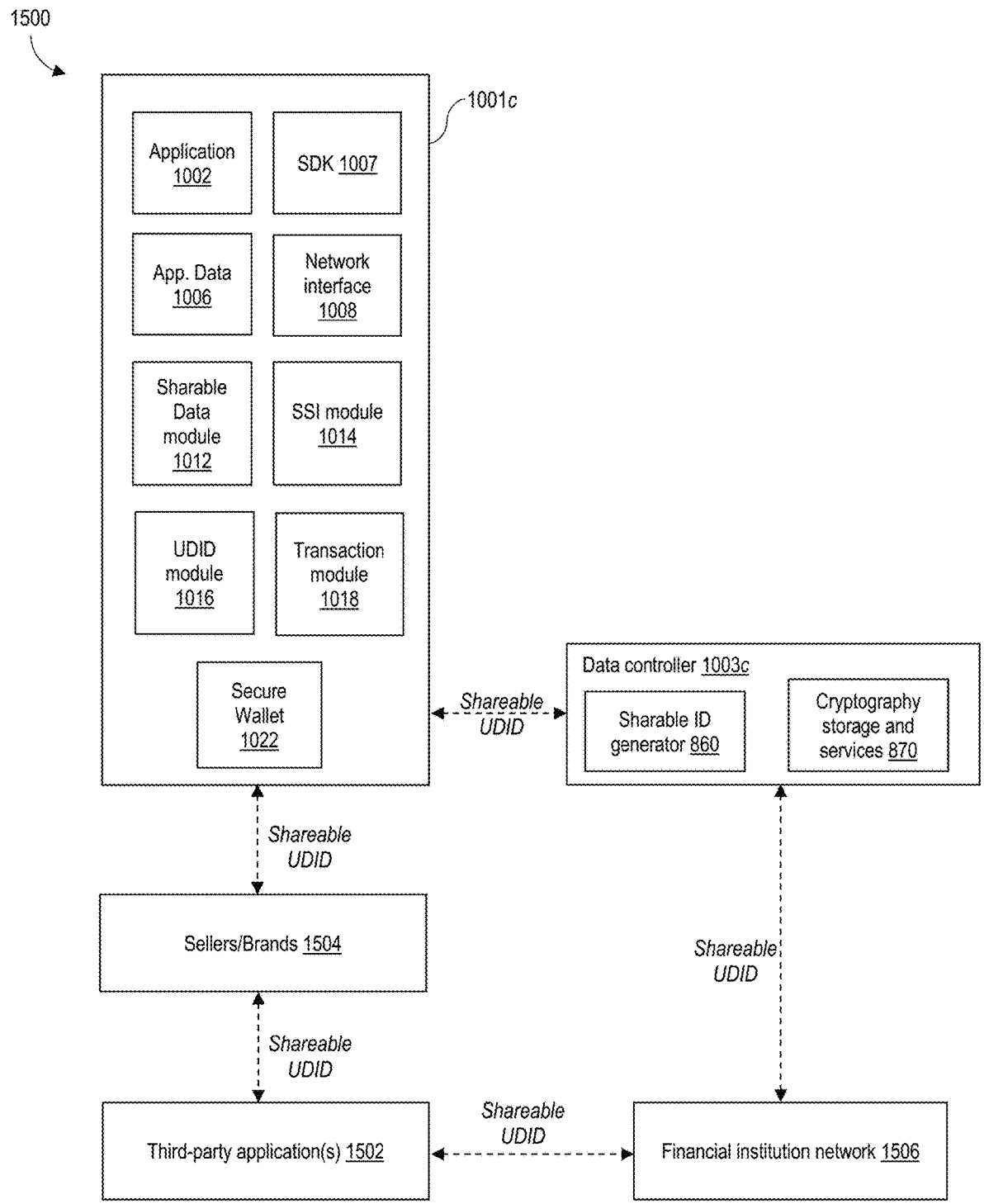
FIG. 15 is a functional block diagram of an online user privacy system, in accordance with certain aspects of the present disclosure.

Referring now to FIG. 15, a functional block diagram of an online user privacy and transaction platform 1500 is shown. For the sake of brevity, like elements between FIG. 15 and prior figures may not be discussed in detail below. In accordance with certain aspects of the present disclosure, platform 1500 comprises an Open Standards Library for data controllers and/or data processors to utilize/configure the components of end user computing environment 1001c and data controller computing environment 1003c to build one or more customized online user privacy and transaction systems (e.g., as described herein). In accordance with certain embodiments, end user computing environment 1001c may comprise a software development kit (SDK) configured to enable a developer user to customize one or more operations of application 1002 and/or sharable data module 1012, SSI module 1014, UDID module 1016, transaction module 1018 and secure digital wallet module 1022. Platform 1500 may enable a developer user to connect or configure one or more customized seller(s)/brand(s) 1504 and financial institution network 1506. Platform 1500 may enable a developer user to connect or configure one or more third-party applications into a network architecture with end user computing environment 1001c and data controller computing environment 1003c. Data controller computing environment 1003c may comprise a cryptography storage and services module 870 to enable a developer user to configure one or more customized cryptography features for the user in the one or more customized online user privacy and transaction systems (e.g., NFT minting, etc.).

Figure 16:
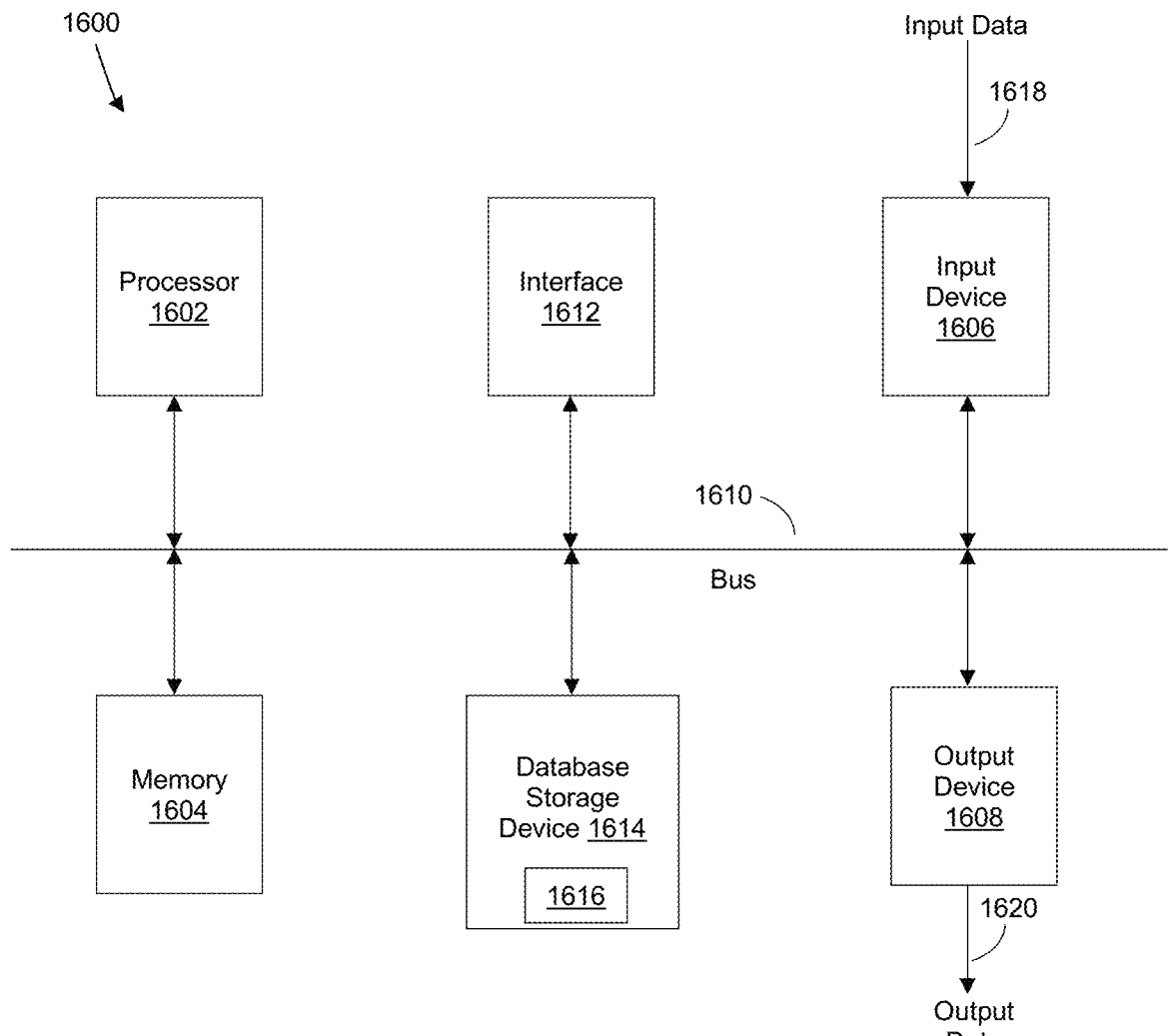
FIG. 16 is an illustrative embodiment of a computing system through which one or more aspects of the present disclosure may be implemented.

Referring now to FIG. 16, a processor-implemented computing system 1600 through which one or more aspects of the present disclosure may be implemented is shown. According to an embodiment, system 1600 may generally comprise at least one processor 1602, or processing unit or plurality of processors, memory 1604, at least one input device 1606 and at least one output device 1608, coupled together via a bus or group of buses 1610. In certain embodiments, input device 1606 and output device 1608 could be the same device. An interface 1612 can also be provided for coupling system 1600 to one or more peripheral devices, for example interface 1612 could be a PCI card or PC card. At least one storage device 1614 which houses at least one database 1616 can also be provided. The memory 1604 can be any form of memory device, for example, volatile or non-volatile memory, solid state storage devices, magnetic devices, etc. The processor 1602 could comprise more than one distinct processing device, for example to handle different functions within system 1600. Input device 1606 receives input data 1618 and can comprise, for example, a keyboard, a pointer device such as a pen-like device or a mouse, audio receiving device for voice-controlled activation such as a microphone, data receiver or antenna such as a modem or wireless data adaptor, data acquisition card, etc. Input data 1618 could come from different sources, for example keyboard instructions in conjunction with data received via a network. Output device 1608 produces or generates output data 1620 and can comprise, for example, a display device or monitor in which case output data 1620 is visual, a printer in which case output data 1620 is printed, a port for example a USB port, a peripheral component adaptor, a data transmitter or antenna such as a modem or wireless network adaptor, etc. Output data 1620 could be distinct and derived from different output devices, for example a visual display on a monitor in conjunction with data transmitted to a network. A user could view data output, or an interpretation of the data output, on, for example, a monitor or using a printer. The storage device 1614 can be any form of data or information storage means, for example, volatile or non-volatile memory, solid state storage devices, magnetic devices, etc.

In use, system 1600 is adapted to allow data or information to be stored in and/or retrieved from, via wired or wireless communication means, at least one database 1616. The interface 1612 may allow wired and/or wireless communication between the processing unit 1602 and peripheral components that may serve a specialized purpose. In general, the processor 1602 can receive instructions as input data 1618 via input device 1606 and can display processed results or other output to a user by utilizing output device 1608. More than one input device 1606 and/or output device 1608 can be provided. It should be appreciated that system 1600 may be any form of terminal, server, specialized hardware, or the like.

It is to be appreciated that system 1600 may be a part of a networked communications system. System 1600 could connect to a network, for example the Internet or a WAN. Input data 1618 and output data 1620 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, system 1600 illustrated in FIG. 16 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 16 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, system 1600 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 1600, or portions thereof, may be stored in a remote memory storage device. It is to be appreciated that the illustrated network connections of FIG. 16 are exemplary and other means of establishing a communications link between multiple computers may be used.

FIG. 16 is intended to provide a brief, general description of an illustrative and/or suitable exemplary environment in which embodiments of the present disclosure may be implemented. FIG. 16 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as system 1600 of FIG. 16. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. It will also be understood that the blocks of the block diagrams illustrate, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for optimizing consumer privacy in online transactions, the system comprising:
   an end user device associated with an entity user, wherein the end user device comprises a personal computing device comprising at least one radio frequency antenna; and
   at least one remote server communicably engaged with the end user device via a network communications interface, wherein the at least one remote server comprises at least one processor and a non-transitory computer-readable storage medium operably engaged with the at least one processor and encoded with processor-executable instructions that, when executed, cause the at least one processor to perform one or more operations, the one or more operations comprising:
   providing an instance of an end user application to the end user device;
   providing, via a graphical user interface of the end user application, a plurality of privacy rights education prompts and a plurality of personal demographic data prompts to the entity user;
   receiving, via the graphical user interface of the end user application, a plurality of user-generated data in response to the plurality of privacy rights education prompts and the plurality of personal demographic data prompts;
   analyzing the plurality of user-generated data according to at least one data processing framework to generate a privacy score for the entity user;
   generating a composite alphanumeric identifier for the entity user according to the plurality of user-generated data,
      wherein the composite alphanumeric identifier comprises a composite identification of two or more of an industry or legal privacy standard, a geographic or jurisdictional identifier, a technology platform identifier, a category good or service identifier, and/or a personal demographic data identifier for the entity user,
      wherein the composite alphanumeric identifier comprises an anonymous identifier for the entity user;
   analyzing a plurality of online privacy policy policies or online terms of service for a plurality of online vendors according to at least one machine learning framework;
   generating a privacy index value for each online vendor in the plurality of online vendors according to the at least one machine learning framework;
   generating an entity privacy rights recommendation by dynamically matching the composite alphanumeric identifier and the generated privacy index value for each online vendor in the plurality of online vendors; and
   providing, via the graphical user interface of the end user application, the entity privacy rights recommendation to the entity user,
      wherein the entity privacy rights recommendation comprises one or more matched online vendor from the plurality of online vendors.

2. The system of claim 1 wherein the entity privacy rights recommendation comprises a graphical link for a uniform resource locator for a webpage associated with the one or more matched online vendor.

3. The system of claim 2 wherein access to the uniform resource locator is enabled only upon the entity user completing a threshold level of privacy rights education prompts.

4. The system of claim 2 wherein the one or more operations further comprise tracking one or more online transaction associated with the graphical link for the uniform resource locator for the webpage associated with the one or more matched online vendor.

5. The system of claim 2 wherein the graphical link to the uniform resource locator is presented within the graphical user interface in response to a contextual trigger based on the entity user's privacy score or transaction history.

6. A system for optimizing consumer privacy in online transactions, the system comprising:
   an end user device associated with an entity user, wherein the end user device comprises a personal computing device comprising at least one radio frequency antenna; and
   at least one remote server communicably engaged with the end user device via a network communications interface, wherein the at least one remote server comprises at least one processor and a non-transitory computer-readable storage medium operably engaged with the at least one processor and encoded with processor-executable instructions that, when executed, cause the at least one processor to perform one or more operations, the one or more operations comprising:
   providing an instance of an end user application to the end user device;
   providing, via a graphical user interface of the end user application, a plurality of privacy rights education prompts and a plurality of personal demographic data prompts to the entity user;
   receiving, via the graphical user interface of the end user application, a plurality of user-generated data in response to the plurality of privacy rights education prompts and the plurality of personal demographic data prompts,
      wherein the plurality of user-generated data comprises a plurality of personal demographic data for the entity user;
   analyzing the plurality of user-generated data according to at least one data processing framework to generate a privacy score for the entity user;
   generating a composite alphanumeric identifier for the entity user according to the plurality of user-generated data,
      wherein the composite alphanumeric identifier for the entity user comprises a composite identification of two or more of an industry or legal privacy standard, a geographic or jurisdictional identifier, a technology platform identifier, a category good or service identifier, and/or a personal demographic data identifier for the entity user;
      wherein the end user device is configured to store the composite alphanumeric identifier for the entity user in a computer-readable storage medium of the end user device;

analyzing a personal demographic data item for the entity user and a plurality of online privacy policies or online terms of service for a plurality of online vendors according to at least one machine learning framework;

generating a privacy index value for each online vendor in the plurality of online vendors according to the at least one machine learning framework;

generating an entity privacy rights recommendation by dynamically matching the composite alphanumeric identifier and the generated privacy index value for each online vendor in the plurality of online vendors;

receiving, from the end user device, the composite alphanumeric identifier for the entity user at one or more time points;

authenticating at least one computing session for the entity user according to the composite alphanumeric identifier;

in response to authenticating the at least one computing session for the entity user according to the composite alphanumeric identifier, receiving, from the end user device, transaction data for at least one transaction associated with the entity user, wherein the transaction data is used to validate a previously generated entity privacy rights recommendation matched to the entity user based on the privacy score and the composite alphanumeric identifier; and recording the transaction data on a blockchain network.

7. The system of claim 6 wherein the one or more operations further comprise receiving the plurality of personal demographic data for the entity user in response to authenticating the at least one computing session for the entity user according to the composite alphanumeric identifier.

8. The system of claim 7 wherein the plurality of personal demographic data comprises de-identified personal demographic data for the entity user.

9. The system of claim 6 wherein the composite alphanumeric identifier is derived from user-supplied responses to privacy rights education prompts.

10. The system of claim 9 wherein the composite alphanumeric identifier is used to generate a transaction-linked financial reward for the entity user.

11. The system of claim 6 wherein the one or more operations further comprise configuring a digital wallet within the instance of the end user application, wherein the digital wallet is configured to store and send at least one digital currency.

12. The system of claim 11 wherein the composite alphanumeric identifier for the entity user comprises an authentication key for the digital wallet.

13. The system of claim 12 wherein the one or more operations further comprise executing a digital currency transaction in response to authenticating the at least one computing session for the entity user according to the composite alphanumeric identifier.

14. The system of claim 11 wherein the one or more operations further comprise generating a non-fungible token for the transaction data, wherein the non-fungible token is configured to be stored in the digital wallet.

15. The system of claim 8 wherein the one or more operations further comprise communicating the de-identified personal demographic data for the entity user to one or more third-party server.

16. The system of claim 15 wherein the one or more operations further comprise receiving one or more digital assets from the one or more third-party server, wherein the one or more digital assets are associated with one or more online vendor in the plurality of online vendors.

17. The system of claim 16 wherein the one or more operations further comprise communicating the one or more digital assets to the end user device, wherein the end user device is configured to display the one or more digital assets to the entity user via the graphical user interface of the end user application.

18. The system of claim 6 wherein the end user device further comprises at least one optical sensor configured to scan at least one machine readable optical code.

19. The system of claim 18 wherein receiving the transaction data comprises scanning the at least one machine readable optical code with the at least one optical sensor of the end user device.

20. A computer-implemented method for optimizing an entity privacy rights recommendation for an online transaction, comprising:

creating, with at least one processor, an entity user account within an end user application comprising a graphical user interface configured to display one or more privacy rights education prompt and an entity user privacy score, wherein the entity user account is associated with an entity user of the end user application;

providing, with the at least one processor via a network interface, an instance of the end user application to an end user device associated with the entity user, wherein the end user device comprises at least one radio frequency antenna, receiving, with the at least one processor, at least one personal demographic data item for the entity user;

assigning, with the at least one processor, a composite alphanumeric identifier for the entity user within the entity user account, wherein the composite alphanumeric identifier comprises a composite identification of two or more of an industry or legal privacy standard, a geographic or jurisdictional identifier, a technology platform identifier, a category good or service identifier, and/or a personal demographic data identifier for the entity user;

receiving, with the end user device, transaction data for at least one transaction associated with the entity user;

generating an entity privacy rights recommendation for one or more online vendor by dynamically matching the composite alphanumeric identifier, the transaction data, and the at least one personal demographic data item for the entity user;

providing, with the end user device via the network interface, the entity privacy rights recommendation to the entity user; and validating, with the at least one processor, at least one transaction for the entity user according to the transaction data, wherein validating the at least one transaction comprises determining that the transaction is consistent with the entity privacy rights recommendation provided to the entity user.

* * * * *